US012738218B2

(12) United States Patent
Lee et al.

(10) Patent No.: US 12,738,218 B2
(45) Date of Patent: Sep. 15, 2026

(54) PIXEL CIRCUIT, DISPLAY PANEL, AND DISPLAY DEVICE

(71) Applicant: LG Display Co., Ltd., Seoul (KR)

(72) Inventors: Hyun Soo Lee, Paju-si (KR); Ji Soo Yeom, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/962,068

(22) Filed: Nov. 27, 2024

(65) Prior Publication Data

US 2025/0218373 A1 Jul. 3, 2025

(30) Foreign Application Priority Data

Dec. 29, 2023 (KR) ........................ 10-2023-0197850

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01)

(58) Field of Classification Search
CPC ... G09G 3/3233; G09G 3/3266; G09G 3/3291
See application file for complete search history.

(56) References Cited

U.S. PATENT DOCUMENTS 10,964,264 B1 3/2021 Kim
2004/0257353 A1* 12/2004 Imamura .............. G09G 3/3241 345/204
2022/0180810 A1 6/2022 Zhang et al.
2023/0071094 A1 3/2023 Son et al.
2023/0094280 A1* 3/2023 Lee ...................... G09G 3/3258 345/691
2025/0185462 A1* 6/2025 Lee ...................... H10K 59/131
2025/0218361 A1 7/2025 Zhang et al.
2025/0336365 A1 10/2025 Zhao et al.

FOREIGN PATENT DOCUMENTS

CN 202796001 U * 3/2013
CN 112397026 A 2/2021
CN 115410523 A 11/2022
CN 115881035 A 3/2023
CN 116564211 A 8/2023
JP 2005-202255 A 7/2005
JP 2006-091923 A 4/2006

(Continued)

OTHER PUBLICATIONS

Korean Intellectual Property Office, Office Action, Korean Patent Application No. 10-2023-0197850, Nov. 29, 2024, eight pages, (with concise explanation of relevance).

(Continued)

*Primary Examiner* — Stacy Khoo
(74) *Attorney, Agent, or Firm* — Fenwick & West LLP

(57) ABSTRACT

The present embodiment relates to a pixel circuit, a display panel, and a display device, and more particularly, to pixel circuit, a display panel, and a display device, which is capable of reducing the number of power lines and/or sufficiently securing the time for sampling a threshold voltage of a driving element in the pixel circuit.

16 Claims, 23 Drawing Sheets

101

(56) References Cited

FOREIGN PATENT DOCUMENTS

| | | | |
|---|---|---|---|
| JP | 2023-037619 | A | 3/2023 |
| KR | 10-2021-0043952 | A | 4/2021 |
| KR | 10-2021-0057629 | A | 5/2021 |
| KR | 10-2021-0084097 | A | 7/2021 |
| KR | 10-2473217 | B1 | 12/2022 |
| KR | 10-2023-0044909 | A | 4/2023 |
| KR | 10-2550292 | B1 | 7/2023 |

OTHER PUBLICATIONS

Japan Patent Office, Office Action, Japanese Patent Application No. 2024-226028, Dec. 23, 2025, eight pages.

Taiwan Intellectual Property Office, Office Action, Taiwanese Patent Application No. 113148153, Oct. 28, 2025, 10 pages.

* cited by examiner

PIXEL CIRCUIT, DISPLAY PANEL, AND DISPLAY DEVICE

CROSS-REFERENCE TO RELATED APPLICATION

This application claims priority to and the benefit of Republic of Korea Patent Application No. 10-2023-0197850 filed on Dec. 29, 2023, which is hereby incorporated by reference in its entirety.

TECHNICAL FIELD

The present disclosure relates to a pixel circuit, a display panel, and a display device.

DESCRIPTION OF RELATED ART

An organic electroluminescent display device includes an organic light emitting diode (OLED), and has advantages of a quick response speed, high luminous efficiency, high luminance, large viewing angle, and the like.

Such an organic electroluminescent display device includes a pixel circuit for operating an OLED. Here, the pixel circuit may include a driving element for driving the OLED.

In addition, an electrical characteristic deviation may exist between pixel circuits. Here, the electrical characteristic of the pixel circuit may include a threshold voltage of a driving element, a mobility of the driving element, etc.

The electrical characteristic deviation between the pixel circuits may become greater as the driving time of the pixel circuits is increasing.

In order to compensate for the electrical characteristic deviation of the driving elements between the pixel circuits, an internal compensation circuit may be added to the pixel circuit.

Here, the internal compensation circuit may be divided into a source follower type and a diode connection type.

SUMMARY

It is newly recognized by inventors of the present application that, the diode connection type has a low threshold voltage loss of the driving element, and thus has a good compensation performance. However, since a threshold voltage of a driving element is sampled simultaneously with addressing of a data voltage in a one horizontal period, a sampling time may become insufficient in high-speed driving of a display device in which one horizontal period is shortened. Further, since power lines for setting voltages of respective nodes are added to the internal compensation circuit, high-resolution design of the display device may become difficult.

Therefore, the inventors of the present disclosure recognized the limitations mentioned above and other limitations associated with the related art, and conducted various experiments to implement a pixel circuit, a display panel, and a display device, which is capable of reducing the number of power lines and/or sufficiently securing the time for sampling a threshold voltage of a driving element in the pixel circuit.

Additional features and aspects of the disclosure are set forth in part in the description that follows and in part will become apparent from the description or may be learned by practice of the inventive concepts provided herein. Other features and aspects of the inventive concepts may be realized and attained by the structures pointed out in the present disclosure, or derivable therefrom, and the claims hereof as well as the appended drawings.

To achieve these and other aspects of the inventive concepts, as embodied and broadly described herein, a pixel circuit includes: a driving element including a first electrode connected to a first node to which a pixel driving voltage is applied, a gate electrode connected to a second node to which a data voltage is applied, and a second electrode; a light-emitting element including an anode electrode and a cathode electrode and configured to emit light by current from the driving element; and a first switch element connected between the anode electrode and the cathode electrode and configured to electrically connect the anode electrode and the cathode electrode to each other in response to a first gate signal.

The first switch element may be configured to be turned on until the light-emitting element emits the light by the current and to maintain an electrical connection of the anode electrode and the cathode electrode to each other until the light-emitting element emits the light.

The pixel circuit may be configured to be driven in the order of an initialization period, a sampling period, a data writing period, and a emission period; the first gate signal may be a gate-on voltage during the initialization period, the sampling period, and the data writing period, and may be a gate-off voltage during the emission period; and the first switch element may be configured to be turned on in response to the gate-on voltage of the first gate signal to electrically connect the anode electrode and the cathode electrode to each other, and to be turned off in response to the gate-off voltage of the first gate signal.

The pixel circuit may further include: a first capacitor connected between a fourth node connected to the anode electrode and the second node; a second switch element connected between the first node and the second node and configured to be turned on in response to a gate-on voltage of the first gate signal to electrically connect the first node and the second node to each other; a third switch element configured to be turned on in response to a gate-on voltage of a second gate signal to electrically connect a driving power line that supplies the pixel driving voltage and the first node to each other; a fourth switch element configured to be turned on in response to a gate-on voltage of a third gate signal to electrically connect a third node connected to the second electrode of the driving element and an initialization power line that supplies an initialization voltage to each other; a second capacitor connected between a data line to which a data voltage is applied and the second node; a fifth switch element configured to be turned on in response to a gate-on voltage of a fourth gate signal to electrically connect the data line and the second capacitor to each other; and a sixth switch element configured to be turned on in response to a gate-on voltage of a fifth gate signal to electrically connect the third node and the fourth node to each other.

A cathode voltage being applied from the cathode electrode to the anode electrode may be a voltage that is lower than the initialization voltage, and the pixel driving voltage may be a voltage that is higher than the initialization voltage.

The pixel circuit may be configured to be driven in the order of an initialization period, a sampling period, a data writing period, and a emission period; in the initialization period, the first gate signal and the second gate signal may be the gate-on voltages, and the third gate signal, the fourth gate signal, and the fifth gate signal may be the gate-off voltages; in the sampling period, the first gate signal and the third gate signal may be the gate-on voltages, and the second gate signal, the fourth gate signal, and the fifth gate signal may be the gate-off voltages; in the data writing period, the first gate signal, the third gate signal, and the fourth gate signal may be the gate-on voltages, and the second gate signal and the fifth gate signal may be the gate-off voltages; and in the emission period, the second gate signal and the fifth gate signal may be the gate-on voltages, and the first gate signal, the third gate signal, and the fourth gate signal may be the gate-off voltages.

The first switch element and the second switch element may be turned on in the initialization period, the sampling period, and the data writing period.

The third switch element may be turned on in the initialization period and the emission period, and the fourth switch element may be turned on in the sampling period and the data writing period.

The fifth switch element may be turned on in the data writing period, and the sixth switch element may be turned on in the emission period.

In another aspect, the present embodiment provides a display device, which includes: a display panel on which a plurality of data lines, a plurality of gate lines, a plurality of pixel circuits, a cathode power line configured to supply a cathode voltage to the pixel circuit, a driving power line configured to supply a pixel driving voltage to the pixel circuit, and an initialization power line configured to supply an initialization voltage to the pixel circuit are disposed; a data driving circuit configured to output a data voltage of pixel data to the plurality of data lines; and a gate driving circuit configured to sequentially output a gate signal to the plurality of gate lines, wherein the pixel circuit includes: a driving element including a first electrode connected to a first node to which the pixel driving voltage is applied, a gate electrode connected to a second node to which the data voltage is applied, and a second electrode; a light-emitting element including an anode electrode and a cathode electrode connected to the cathode power line and configured to emit light by current from the driving element; and a first switch element connected between the anode electrode and the cathode electrode and configured to electrically connect the anode electrode and the cathode electrode to each other in response to a first gate signal.

The pixel circuit may further include a second switch element connected between the first node and the second node and configured to electrically connect the first node and the second node to each other in response to the first gate signal.

The pixel circuit may be configured to be driven in the order of an initialization period, a sampling period, a data writing period, and a emission period; the first gate signal may be a gate-on voltage during the initialization period, the sampling period, and the data writing period, and may be a gate-off voltage during the emission period; the first switch element may be configured to be turned on in response to the gate-on voltage of the first gate signal to electrically connect the anode electrode and the cathode electrode to each other, and to be turned off in response to the gate-off voltage of the first gate signal; and the second switch element may be configured to be turned on in response to the gate-on voltage of the first gate signal to electrically connect the first node and the second node to each other, and to be turned off in response to the gate-off voltage of the first gate signal.

The pixel circuit may further include: a first capacitor connected between a fourth node connected to the anode electrode and the second node; a third switch element configured to be turned on in response to a gate-on voltage of a second gate signal to electrically connect the driving power line and the first node to each other; a fourth switch element configured to be turned on in response to a gate-on voltage of a third gate signal to electrically connect a third node connected to the second electrode of the driving element and the initialization power line to each other; a second capacitor connected between a data line to which a data voltage is applied and the second node; a fifth switch element configured to be turned on in response to a gate-on voltage of a fourth gate signal to electrically connect the data line and the second capacitor to each other; and a sixth switch element configured to be turned on in response to a gate-on voltage of a fifth gate signal to electrically connect the third node and the fourth node to each other.

The pixel circuit may be configured to be driven in the order of an initialization period, a sampling period, a data writing period, and a emission period; in the initialization period, the first gate signal and the second gate signal may be the gate-on voltages, and the third gate signal, the fourth gate signal, and the fifth gate signal may be the gate-off voltages; in the sampling period, the first gate signal and the third gate signal may be the gate-on voltages, and the second gate signal, the fourth gate signal, and the fifth gate signal may be the gate-off voltages; in the data writing period, the first gate signal, the third gate signal, and the fourth gate signal may be the gate-on voltages, and the second gate signal and the fifth gate signal may be the gate-off voltages; and in the emission period, the second gate signal and the fifth gate signal may be the gate-on voltages, and the first gate signal, the third gate signal, and the fourth gate signal may be the gate-off voltages.

In another aspect, the present embodiment provides a display panel, which includes: a display area on which an input image is displayed; a non-display area outside the display area; a plurality of cathode power lines disposed within the display area; and a plurality of pixel circuits disposed in the display area, wherein each of the pixel circuits includes: a light-emitting element including an anode electrode and a cathode electrode and configured to emit light by current from a driving element; and a first switch element including a first electrode connected to the anode electrode, a second electrode connected to the cathode electrode, and a gate electrode to which a scan signal is applied, wherein the cathode electrode of the light-emitting element and the second electrode of the first switch element are connected to the corresponding cathode power line.

The display panel may further include: a first shorting bar disposed on one side of the non-display area and connected to one end of each of the cathode power lines; a second shorting bar disposed on the other side of the non-display area and connected to the other end of each of the cathode power lines.

The display panel may further include: an insulating layer covering the first electrode and the second electrode of the first switch element and the cathode power line; a first planarization layer covering the insulating layer; a first connection electrode coming in contact with the cathode power line in the non-display area through a first contact hole penetrating the first planarization layer; a second connection electrode coming in contact with the first electrode of the first switch element in the display area through a second contact hole penetrating the first planarization layer; a second planarization layer covering the first connection electrode and the second connection electrode; and a bank layer covering the second planarization layer, wherein the anode electrode may come in contact with the second connection electrode in the display area through a third contact hole penetrating the second planarization layer, and the cathode electrode may come in contact with the first connection electrode through a fourth contact hole penetrating the bank layer and second planarization layer.

In another aspect, the present embodiment provides a pixel circuit including: a driving element including a first electrode connected to a first node to which a pixel driving voltage is applied, a gate electrode connected to a second node to which a data voltage is applied, and a second electrode; a light-emitting element including an anode electrode connected to a fourth node and a cathode electrode connected to a cathode power line; a first switch element including a first electrode connected to the fourth node, a gate electrode connected to a first gate line, and a second electrode connected to the cathode electrode; a first capacitor connected between the fourth node and the second node; a second switch element including a first electrode connected to the first node, a gate electrode connected to the first gate line, and a second electrode connected to the second node; a third switch element including a first electrode connected to a driving power line that supplies the pixel driving voltage, a gate electrode connected to a second gate line, and a second electrode connected to the first node; a fourth switch element including a first electrode connected to an initialization power line that supplies an initialization voltage, a gate electrode connected to a third gate line, and a second electrode connected to the third node; a second capacitor connected between a data line to which a data voltage is applied and the second node; a fifth switch element including a first electrode connected to the data line, a gate electrode connected to a fourth gate line, and a second electrode connected to the second capacitor; and a sixth switch element including a first electrode connected to the third node, a gate electrode connected to a fifth gate line, and a second electrode connected to the fourth node.

According to the present embodiment as described above, since it is possible to reduce the number of power lines and/or sufficiently securing the time for sampling a threshold voltage of a driving element in a pixel circuit, high-speed driving and high-resolution design of a display device may be facilitated.

Various useful advantages and effects of the embodiments are not limited to the above-described contents and will be more easily understood from descriptions of the specific embodiments.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, that may be included to provide a further understanding of the disclosure and may be incorporated in and constitute a part of the disclosure, illustrate embodiments of the disclosure and together with the description serve to explain various principles of the disclosure.

The above and other objects, features, and advantages of the present disclosure will become more apparent to those of ordinary skill in the art by describing exemplary embodiments thereof in detail with reference to the attached drawings, in which.

Figure 1:
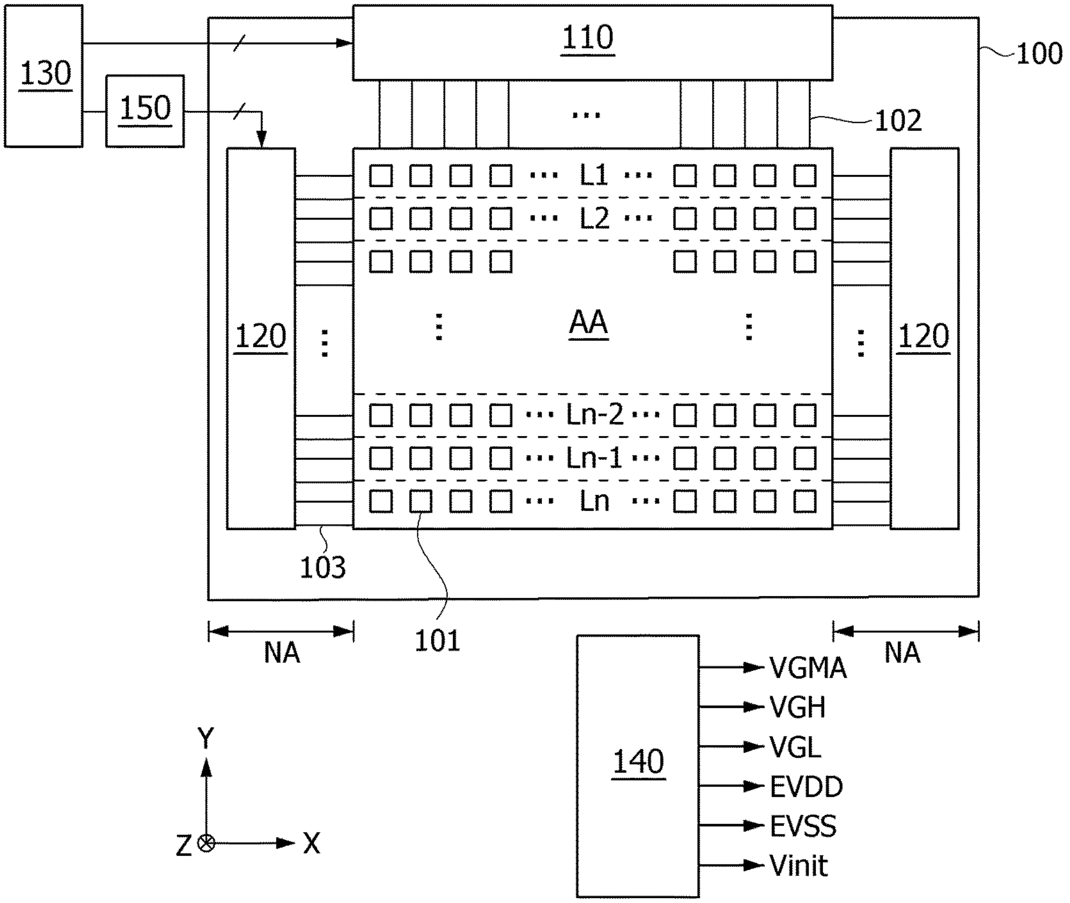
FIG. 1 is a block diagram showing a display device according to an embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which may be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a particular order. Like reference numerals designate like elements throughout. Names of the respective elements used in the following explanations may be selected only for convenience of writing the specification and may be thus different from those used in actual products.

The advantages and features of the present disclosure and methods for accomplishing the same will be more clearly understood from example embodiments described below with reference to the accompanying drawings. However, the present disclosure is not limited to the following example embodiments but may be implemented in various different forms. Rather, the present embodiments will make the disclosure of the present disclosure complete and allow those skilled in the art to completely comprehend the scope of the present disclosure. The present disclosure is only defined within the scope of the accompanying claims. Any implementation described herein as an "example" is not necessarily to be construed as preferred or advantageous over other implementations.

Shapes, sizes, ratios, angles, numbers, and the like disclosed in the drawings for describing the example embodiments of the present disclosure are exemplary, and the present disclosure is not limited to the illustrated items. Like reference numerals refer to like elements throughout. In addition, in describing the present disclosure, if it is determined that the detailed description of the related known technology may unnecessarily obscure the subject matter of the present disclosure, the detailed description thereof will be omitted or briefly provided.

The terms such as "comprising," "including," and "having," used herein are generally intended to allow other components to be added unless the terms are used with the term "only." Any references to singular may include plural unless expressly stated otherwise.

Components are interpreted to include an ordinary error range even if not expressly stated.

For the description of a positional relationship, for example, when the positional relationship and the interconnected relationship between two parts is described as "on," "above," "below," "next to," "connect or couple", "crossing or intersecting", and the like, one or more other parts may be interposed therebetween unless a more limiting term such as "immediately" or "directly" is used in the expression.

The terms "first," "second," "A," "B," "(a)," "(b)" and the like may be used to distinguish components from each other, but the functions, structures, essence, sequence, order, or number of the components are not limited by ordinal numbers or component names in front of the components. Because the claims are written around essential components, the ordinal numbers preceding the component names in the claims may not match the ordinal numbers preceding the component names in the embodiments. Also, when an element or layer is described as being "connected," "coupled," or "adhered" to another element or layer, the element or layer can not only be directly connected, or adhered to that other element or layer, but also be indirectly connected, or adhered to that other another element or layer with one or more intervening elements or layers "disposed" between the elements or layers, unless otherwise specified.

The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, or the third element.

Features of various embodiments of the present disclosure may be partially or overall coupled to or combined with each other, and may be variously inter-operated with each other and driven technically as those skilled in the art can sufficiently understand. Embodiments of the present disclosure may be carried out independently from each other, or may be carried out together in co-dependent relationship.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" may apply, for example, to a separate circuit or structure, an integrated circuit, a computational block of a circuit device, or any structure configured to perform a described function as should be understood to one of ordinary skill in the art.

In a display device of the present disclosure, a display panel driving circuit, a pixel circuit, a level shifter, and the like may include transistors. The transistors may be implemented by oxide transistors including oxide semiconductor, low temperature poly silicon (LTPS) transistors including LTPS, and the like. Here, the transistor may be a thin film transistor (TFT).

A transistor is a three-terminal element including a gate, a source and a drain. The source is a terminal that supplies a carrier to the transistor. In the transistor, the carrier begins to flow from the source. A drain is a terminal through which the carrier flows out of the transistor. The flow of the carrier in the transistor flows from the source to the drain. In the case of an N-channel transistor, since the carrier is an electron, the source voltage has a voltage lower than the drain voltage so that electrons may flow from the source to the drain. In the N-channel transistor, the direction of current flows from the drain to the source. In the case of a P-channel transistor, since the carrier is a hole, the source voltage is higher than the drain voltage so that the hole may flow from the source to the drain. In the P-channel transistor, current flows from the source to the drain because the hole flows from the source to the drain. It should be noted that the source and drain of the transistor are not fixed. For example, the source and drain may be changed according to the applied voltage. Therefore, the present disclosure is not limited due to the source and drain of the transistor. In the following description, a drain and a source of a transistor is called a first electrode and a second electrode.

The scan signal swings between a gate-on voltage and a gate-off voltage. The gate-off voltage may be interpreted as a first voltage, and the gate-on voltage may be interpreted as a second voltage. The transistor is turned on in response to the gate-on voltage, while the transistor is turned off in response to the gate-off voltage. In the case of an N-channel transistor, the gate-on voltage may be a gate high voltage (VGH), and the gate-off voltage may be a gate low voltage (VGL). In the case of a P-channel transistor, the gate-on voltage may be the gate low voltage (VGL), and the gate-off voltage may be the gate high voltage (VGH).

Hereinafter, various example embodiments of the present disclosure will be described in detail with reference to the accompanying drawings. Further, all the components of each display device according to all embodiments of the present disclosure are operatively coupled and configured.

Figure 2:
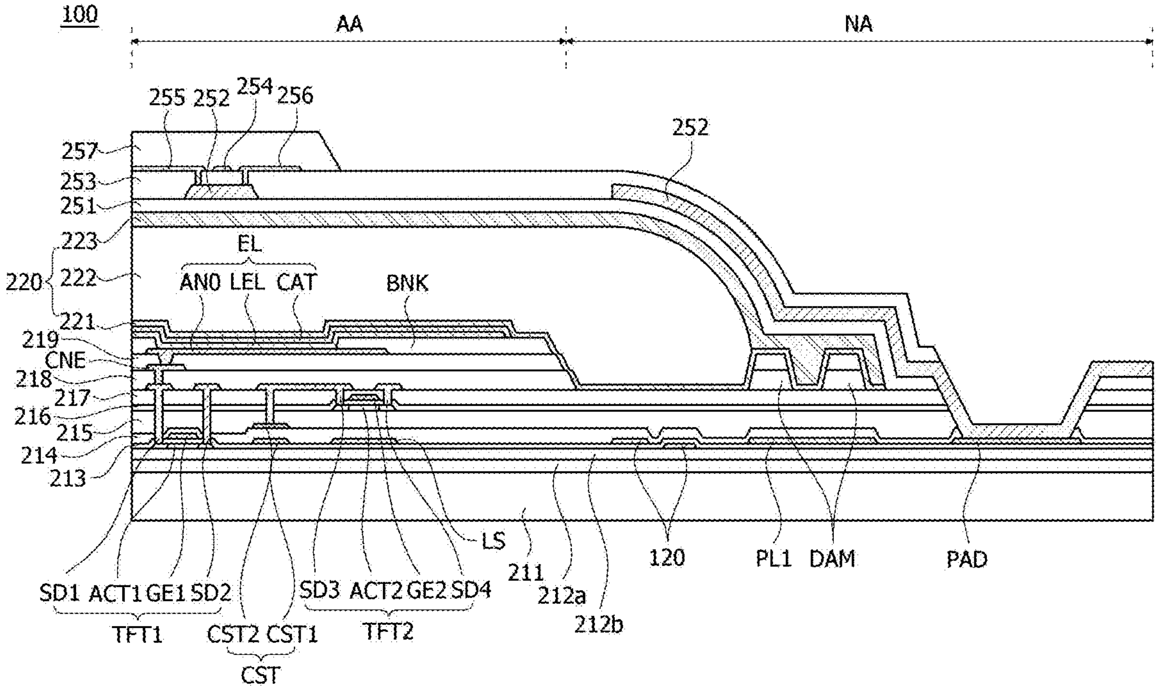
FIG. 2 is a cross-sectional view of a display panel illustrated in FIG. 1 according to an embodiment of the present disclosure.

FIG. 1 is a block diagram showing a display device according to an embodiment of the present disclosure. FIG. 2 is a cross-sectional view of a display panel illustrated in FIG. 1 according to an embodiment of the present disclosure.

Referring to FIGS. 1 and 2, a display device according to an embodiment of the present disclosure may be an organic light emitting display device, but the present disclosure is not limited thereto. For example, the display device of the present disclosure may also be other types of display devices such as micro light-emitting diode (micro-LED) display device and the like. Such a display device may include a display panel 100, a display panel driving circuit for writing pixel data on pixel circuits of the display panel 100, and a power circuit 140 generating a power required to drive the pixel circuits and the display panel driving circuit.

The display panel 100 may be a panel of a rectangular structure having a length in X-axis direction, a width in Y-axis direction, and a thickness in Z-axis direction, but the present disclosure is not limited thereto. As an example, the display panel 100 may be a panel having a rectangular structure with a length in the Y-axis direction, a width in the X-axis direction. As another example, the display panel 100 may be a panel having a structure of any shape such as a square shape, a circle shape, an oval shape, etc.

A display area AA of the display panel 100 includes a pixel array that displays an image thereon. The pixel array includes a plurality of data lines 102, a plurality of gate lines 103 that cross the plurality of data lines 102, and pixel circuits 101 disposed in a matrix form at intersections of the plurality of data lines 102 and plurality of gate lines 103. The display panel 100 may further include power lines commonly connected to the pixel circuits 101. The power lines are connected to the pixel circuits, and supply the pixel circuits 101 with constant voltages required to drive the pixel circuits 101.

The pixel circuits 101 may be divided into two or more subpixel circuits for color implementation. For example, three subpixel circuits sequentially arranged in X-axis direction may be divided into a red subpixel circuit, a green subpixel circuit, and a blue subpixel circuit, but the present disclosure is not limited thereto.

Further, four subpixel circuits sequentially arranged in X-axis direction may be divided into a red subpixel circuit, a green subpixel circuit, a blue subpixel circuit, and a white subpixel circuit.

Each of the pixel circuits 101 is connected to the data line, the gate lines, and the power lines.

The pixel array includes a plurality of pixel lines L1 to Ln. Each of the pixel lines L1 to Ln includes 1-line pixel circuits disposed along a line direction (X-axis direction) in the pixel array of the display panel 100. The pixel circuits disposed on 1 pixel line share the gate lines 103. The pixel circuits disposed in a column direction (Y-axis direction) along a data line direction share the same data line 102. As an example, one horizontal period is a time obtained by dividing one frame period by the total number of pixel lines L1 to Ln.

The display panel 100 may be implemented as a non-transmission type display panel or a transmission type display panel. The transmission type display panel may be applied to a transparent display device in which an image is displayed on a screen and a real thing in the background is seen. The display panel 100 may be implemented as a flexible display panel or a non-flexible display panel.

At least a part of the display panel 100 may include a transmission type pixel structure that overlaps an optical device disposed on a lower part of the display panel 100. The optical device may include an image sensor (or camera), a proximity sensor, and an optical element such as an illumination element, or an infrared sensor for face recognition.

The cross-sectional structure of such display panel 100 is as follows.

FIG. 2 is a cross-sectional view of a display panel illustrated in FIG. 1.

The cross-sectional view of FIG. 2 includes two thin film transistors TFT1 and TFT2 and one capacitor CST. The two thin film transistors TFT1 and TFT2 include a polycrystalline thin film transistor TFT1 containing a polycrystalline semiconductor material such as low temperature polysilicon (LTPS) and an oxide thin film transistor TFT2 containing an oxide semiconductor material, but the present disclosure is not limited thereto.

The polycrystalline thin film transistor TFT1 shown in FIG. 2 is an emission switching thin film transistor or a driving transistor connected to the light emitting element EL, and the oxide thin film transistor TFT2 is any one switching thin film transistor connected to the capacitor CST.

In FIG. 2, one pixel includes the light emitting element EL and a pixel driving circuit that applies a driving current to the light emitting element EL. The pixel driving circuit is disposed on a substrate 211, and the light emitting element EL is disposed on the pixel driving circuit. In addition, an encapsulation layer 220 is disposed on the light emitting element EL. The encapsulation layer 220 protects the light emitting element EL.

The pixel driving circuit may refer to one pixel array portion including a driving thin film transistor, a switching thin film transistor, and a capacitor. In addition, the light emitting element EL may refer to an array portion for light emission including an anode electrode, a cathode electrode, and an emission layer disposed therebetween.

In an embodiment, a driving thin film transistor and at least one switching thin film transistor use oxide semiconductor as an active layer. A thin film transistor that uses an oxide semiconductor material as an active layer has an excellent leakage current blocking effect and a relatively low manufacturing cost as compared with a thin film transistor that uses a polycrystalline semiconductor material as an active layer. Accordingly, in order to reduce the power consumption and to lower the manufacturing cost, a pixel driving circuit according to an embodiment includes a driving thin film transistor and at least one switching thin film transistor using an oxide semiconductor material.

All thin film transistors constituting a pixel driving circuit may be implemented by using the oxide semiconductor material, or only some switching thin film transistors may be implemented by using the oxide semiconductor material.

The substrate 211 may be implemented as a multi-layer in which an organic layer and an inorganic layer are alternately stacked. For example, the substrate 211 may be formed by alternately stacking an organic layer such as polyimide and an inorganic layer such as silicon oxide ($SiO_2$).

In addition, the substrate 211 may include glass, plastic, or a flexible polymer film. For example, the flexible polymer film may be made of any one of polyethylene terephthalate (PET), polycarbonate (PC), acrylonitrile-butadiene-styrene copolymer (ABS), polymethyl methacrylate (PMMA), polyethylene naphthalate (PEN), polyether sulfone (PES), cyclic olefin copolymer (COC), triacetylcellulose (TAC) film, polyvinyl alcohol (PVA) film, polyimide (PI) film, and polystyrene (PS), which is only an example and is not necessarily limited thereto.

A lower buffer layer 212*a* is formed on the substrate 211. The lower buffer layer 212*a* is for blocking moisture or the like that may permeate from the outside, and may be used by stacking a silicon oxide ($SiO_2$) layer or the like in multiple layers. An auxiliary buffer layer 212*b* may be further disposed on the lower buffer layer 212*a* to protect the element from moisture permeation.

The polycrystalline thin film transistor TFT1 is formed above the substrate 211. The polycrystalline thin film transistor TFT1 may use a polycrystalline semiconductor as an active layer. The polycrystalline thin film transistor TFT1 includes a first active layer ACT1 having a channel through which electrons or holes move, a first gate electrode GE1, a first source electrode SD1, and a first drain electrode SD2.

The first active layer ACT1 includes a first channel region, a first source region disposed on one side of the first channel region, and a first drain region disposed on the other side of the first channel region.

The first source region and the first drain region are regions formed by doping Group 5 or Group 3 impurity ions, e.g., phosphorus (P) or boron (B), into an intrinsic polycrystalline semiconductor material at a predetermined concentration to form a conductor. The first channel region provides a path through which electrons or holes move by maintaining an intrinsic state of the polycrystalline semiconductor material.

In addition, the polycrystalline thin film transistor TFT1 includes the first gate electrode GE1 overlapping the first channel region of the first active layer ACT1. A first gate insulating layer 213 is disposed between the first gate electrode GE1 and the first active layer ACT1. The first gate insulating layer 213 may be used as a single layer or multiple layers of an inorganic layer such as a silicon oxide ($SiO_2$) layer, silicon nitride (SiNx) layer, or the like.

In one embodiment, the polycrystalline thin film transistor TFT1 has a top gate structure in which the first gate electrode GE1 is positioned above the first active layer ACT1, but the present disclosure is not limited thereto. For example, the polycrystalline thin film transistor TFT1 may have a bottom gate structure or a dual gate structure. Accordingly, a first electrode CST1 included in the capacitor CST and a light blocking layer LS included in the oxide thin film transistor TFT2 may be formed of the same material as the first gate electrode GE1. By forming the first gate electrode GE1, the first electrode CST1, and the light blocking layer LS by one mask process, the mask process may be reduced. However, the present disclosure is not limited thereto, the light blocking layer LS may be formed on the lower buffer layer 212*a* and the auxiliary buffer layer 212*b* by a separate mask process. In this case, the light blocking layer LS may be formed below any transistors, without being limited to the oxide thin film transistor TFT2. In addition, the light blocking layer LS may be disposed below the capacitor CST to overlap therewith to form a double capacitor.

The first gate electrode GE1 is made of a metallic material. For example, the first gate electrode GE1 may be a single layer or multiple layers made of any one of molybdenum (Mo), aluminum (Al), chromium (Cr), gold (Au), titanium (Ti), nickel (Ni), neodymium (Nd), and copper (Cu), or an alloy thereof, but is not limited thereto.

A first interlayer insulating layer 214 is disposed on the first gate electrode GE1. The first interlayer insulating layer 214 may be formed of silicon oxide ($SiO_2$), silicon nitride (SiNx), or the like.

The display panel 100 may further include an upper buffer layer 215, a second gate insulating layer 216, and a second interlayer insulating layer 217 sequentially disposed on the first interlayer insulating layer 214. The polycrystalline thin film transistor TFT1 includes the first source electrode SD1 and the first drain electrode SD2 formed on the second interlayer insulating layer 217 and connected to the first source region and the first drain region, respectively.

The first source electrode SD1 and the first drain electrode SD2 may be a single layer or multiple layers made of any one of molybdenum (Mo), aluminum (Al), chromium (Cr), gold (Au), titanium (Ti), nickel (Ni), neodymium (Nd), and copper (Cu), or an alloy thereof, but are not limited thereto.

The upper buffer layer 215 separates a second active layer ACT2 of the oxide thin film transistor TFT2 made of an oxide semiconductor material from the first active layer ACT1 made of a polycrystalline semiconductor material and provides a basis for forming the second active layer ACT2.

The second gate insulating layer 216 covers the second active layer ACT2 of the oxide thin film transistor TFT2. The second gate insulating layer 216 is formed on the second active layer ACT2 made of an oxide semiconductor material and thus is implemented as an inorganic layer. For example, the second gate insulating layer 216 may be formed of silicon oxide (SiO2), silicon nitride (SiNx), or the like.

A second gate electrode GE2 is made of a metallic material. For example, the second gate electrode GE2 may be a single layer or multiple layers made of any one of molybdenum (Mo), aluminum (Al), chromium (Cr), gold (Au), titanium (Ti), nickel (Ni), neodymium (Nd), and copper (Cu), or an alloy thereof, but is not limited thereto.

In addition, the oxide thin film transistor TFT2 includes the second active layer ACT2 formed on the upper buffer layer 215 and made of an oxide semiconductor material, the second gate electrode GE2 disposed on the second gate insulating layer 216, and a second source electrode SD3 and a second drain electrode SD4 disposed on the second interlayer insulating layer 217.

The second active layer ACT2 is made of an oxide semiconductor material and includes an intrinsic second channel region that is not doped with impurities, and a second source region and a second drain region that are doped with impurities to become conductors.

The oxide thin film transistor TFT2 further includes the light blocking layer LS located below the upper buffer layer 215 and overlapping the second active layer ACT2. The light blocking layer LS may block light incident on the second active layer ACT2 to ensure the reliability of the oxide thin film transistor TFT2. The light blocking layer LS may be made of the same material as the first gate electrode GE1 and may be formed on the top surface of the first gate insulating layer 213. The light blocking layer LS may be electrically connected to the second gate electrode GE2 to form a dual gate structure.

The second source electrode SD3 and the second drain electrode SD4 may be simultaneously formed together with the first source electrode SD1 and the first drain electrode SD2 on the second interlayer insulating layer 217 using the same material, thereby reducing the number of mask processes.

In addition, the capacitor CST may be realized by disposing a second electrode CST2 on the first interlayer insulating layer 214 to overlap the first electrode CST1. The second electrode CST2 may be a single layer or multiple layers made of any one of, for example, molybdenum (Mo), aluminum (Al), chromium (Cr), gold (Au), titanium (Ti), nickel (Ni), neodymium (Nd), and copper (Cu), or an alloy thereof.

The capacitor CST stores the data voltage applied through the data line DL for a certain period of time and provides it to the light emitting element EL. The capacitor CST includes two electrodes corresponding to each other and a dielectric disposed therebetween. The first interlayer insulating layer 214 is positioned between the first electrode CST1 and the second electrode CST2.

The first electrode CST1 or the second electrode CST2 of the capacitor CST may be electrically connected to the second source electrode SD3 or the second drain electrode SD4 of the oxide thin film transistor TFT2. However, the present disclosure is not limited thereto, and the connection relationship of the capacitor CST may vary depending on the pixel driving circuit.

In addition, a first planarization layer 218 and a second planarization layer 219 are sequentially disposed on the pixel driving circuit to planarize a step caused due to the pixel driving circuit. The first planarization layer 218 and the second planarization layer 219 may be an organic layer such as polyimide or acrylic resin.

Then, the light emitting element EL is formed on the second planarization layer 219.

The light emitting element EL includes an anode electrode ANO, a cathode electrode CAT, and an emission layer LEL disposed between the anode electrode ANO and the cathode electrode CAT. When implemented in a pixel driving circuit that uses in common a low potential voltage connected to the cathode electrode CAT, the anode electrode ANO is disposed as a separate electrode for each sub-pixel. When implemented in a pixel driving circuit that uses a high potential voltage in common, the cathode electrode CAT may be disposed as a separate electrode for each sub-pixel.

The light emitting element EL is electrically connected to a driving element through an intermediate electrode CNE disposed on the first planarization layer 218. Specifically, the anode electrode ANO of the light emitting element EL and the first source electrode SD1 of the polycrystalline thin film transistor TFT1 constituting the pixel driving circuit are connected to each other through the intermediate electrode CNE.

The anode electrode ANO is connected to the intermediate electrode CNE exposed through a contact hole penetrating the second planarization layer 219. In addition, the intermediate electrode CNE is connected to the first source electrode SD1 exposed through a contact hole penetrating the first planarization layer 218, but is not limited thereto. For example, depending on the structure of the pixel driving circuit, the intermediate electrode CNE may be connected to the first drain electrode SD2, the second source electrode SD3 or the second drain electrode SD4.

The intermediate electrode CNE acts as a medium connecting the first source electrode SD1 to the anode electrode ANO. The intermediate electrode CNE may be made of a conductive material such as copper (Cu), silver (Ag), molybdenum (Mo), or titanium (Ti).

The anode electrode ANO may be formed in a multilayer structure including a transparent conductive layer and an opaque conductive layer having high reflection efficiency. The transparent conductive layer may be made of a material, such as indium-tin-oxide (ITO) or indium-zinc-oxide (IZO), having a relatively large work function value, while the opaque conductive layer may be formed in a single-layer or multilayer structure containing aluminum (Al), silver (Ag), copper (Cu), lead (Pb), molybdenum (Mo), titanium (Ti), or an alloy thereof. For example, the anode electrode ANO may be formed in a structure in which a transparent conductive layer, an opaque conductive layer, and a transparent conductive layer are sequentially stacked, or a structure in which a transparent conductive layer and an opaque conductive layer are sequentially stacked.

The emission layer LEL is formed by stacking a hole-related layer, an organic emission layer, and an electron-related layer on the anode electrode ANO in that order or in reverse order.

The bank layer BNK may be a pixel defining layer that exposes the anode electrode ANO of each pixel. The bank layer BNK may be made of an opaque material (e.g., black) to prevent or reduce light interference between adjacent pixels. In this case, the bank layer BNK contains a light blocking material made of at least one of a color pigment, organic black, and carbon. A spacer may be further disposed on the bank layer BNK.

The cathode electrode CAT is formed opposite to the anode electrode ANO with the emission layer LEL interposed therebetween, and is formed on the top surface and side surface of the emission layer LEL. The cathode electrode CAT may be integrally formed over the entire display area AA. When applied to a top emission type organic light emitting display device, the cathode electrode CAT may be formed of a transparent conductive layer such as indium-tin-oxide (ITO) or indium-zinc-oxide (IZO).

The encapsulation layer 220 for suppressing moisture permeation may be further disposed on the cathode electrode CAT.

The encapsulation layer 220 may block the permeation of external moisture or oxygen into the light emitting element EL, which is vulnerable to external moisture or oxygen. To achieve this, the encapsulation layer 220 may include at least one layer of inorganic encapsulation layer and at least one layer of organic encapsulation layer, but is not limited thereto. In the present disclosure, the structure of the encapsulation layer 220 in which a first encapsulation layer 221, a second encapsulation layer 222, and a third encapsulation layer 223 are sequentially stacked will be described as an example.

The first encapsulation layer 221 is formed over the substrate 211 over which the cathode electrode CAT is formed. The third encapsulation layer 223 is formed over the substrate 211 over which the second encapsulation layer 222 is formed, and may be formed to surround the top, bottom, and side surfaces of the second encapsulation layer 222 together with the first encapsulation layer 221. The first encapsulation layer 221 and the third encapsulation layer 223 may minimize, reduce, or prevent the permeation of external moisture or oxygen into the light emitting element EL. The first encapsulation layer 221 and the third encapsulation layer 223 may be made of an inorganic insulating material, such as silicon nitride (SiNx), silicon oxide (SiOx), silicon oxynitride (SiON), or aluminum oxide ($Al_2O_3$), capable of low temperature deposition. Since the first encapsulation layer 221 and the third encapsulation layer 223 are deposited in a low temperature atmosphere, it is possible to prevent or reduce the light emitting element EL, which is vulnerable to a high temperature atmosphere, from being damaged during the deposition process of the first encapsulation layer 221 and the third encapsulation layer 223.

The second encapsulation layer 222 may serve as a buffer to relieve stress between layers caused by the bending of the display device 20 and may planarize a step difference between layers. The second encapsulation layer 222 may be formed of a non-photosensitive organic insulating material such as acrylic resin, epoxy resin, phenolic resin, polyamide resin, polyimide resin, polyethylene, or silicon oxycarbide (SiOC), or a photosensitive organic insulating material such as photoacrylic, above the substrate 211 over which the first encapsulation layer 221 is formed, but is not limited thereto. When the second encapsulation layer 222 is formed by an inkjet method, a dam DAM may be disposed to prevent or reduce the second encapsulation layer 222 in liquid form from diffusing to the edge of the substrate 211. The dam DAM may be disposed closer to the edge of the substrate 211 than the second encapsulation layer 222. Due to the dam DAM, the second encapsulation layer 222 may be prevented or reduced from diffusing to a pad region having a conductive pad disposed at the outermost portion of the substrate.

The dam DAM is designed to prevent or reduce the diffusion of the second encapsulation layer 222, but if the second encapsulation layer 222 is formed to exceed the height of the dam DAM during the process, the second encapsulation layer 222, which is an organic layer, may be exposed to the outside, which may facilitate the permeation of moisture or the like into the light emitting element. Therefore, to prevent or reduce this, at least ten or more dams DAM may be formed in an overlapping manner.

The dam DAM may be disposed on the second interlayer insulating layer 217 of a non-display area NA.

In addition, the dam DAM may be formed simultaneously with the first planarization layer 218 and the second planarization layer 219. When the first planarization layer 218 is formed, a lower layer of the dam DAM may be formed together, and when the second planarization layer 219 is formed, an upper layer of the dam DAM may be formed together, and they may be stacked in a double-layered structure.

Therefore, the dam DAM may be made of the same material as the first planarization layer 218 and the second planarization layer 219, but is not limited thereto.

The dam DAM may be formed to overlap cathode power line PL1. For example, in the non-display area NA, the cathode power line PL1 may be formed in a lower layer of an area in which the dam DAM is located. Here, the non-display area NA may include a bezel area.

The cathode power line PL1 and the gate driving circuit 120 configured in the form of a gate in panel (GIP) may be formed to surround the outer periphery of the display panel, and the cathode power line PL1 may be positioned further outward than the gate driving circuit 120. In addition, the cathode power line PL1 may be connected to the cathode electrode CAT to apply a common voltage. The gate driving circuit 120 is depicted simply in the plan and cross-sectional views of the drawings, but may be configured using a thin film transistor with the same structure as the thin film transistor of the display area AA.

The cathode power line PL1 is disposed further outward than the gate driving circuit 120. The cathode power line PL1 is disposed further outward than the gate driving circuit 120 and surrounds the display area AA. For example, the cathode power line PL1 may be made of the same material as the first gate electrode GE1, but is not limited thereto, and may be made of the same material as the second electrode CST2 or the first source and drain electrodes SD1 and SD2, but is not limited thereto.

Further, the cathode power line PL1 may be electrically connected to the cathode electrode CAT. The cathode power line PL1 may supply the low voltage power EVSS to the pixels in the display area AA.

A touch layer may be disposed on the encapsulation layer 220. In the touch layer, a touch buffer layer 251 may be positioned between a touch sensor metal including touch electrode connection lines 252 and 254 and touch electrodes 255 and 256, and the cathode electrode CAT of the light emitting element EL.

The touch buffer layer 251 may prevent or reduce a chemical solution (developer, etchant, or the like) used in the manufacturing process of the touch sensor metal disposed on the touch buffer layer 251, moisture from the outside, or the like from permeating the emission layer LEL containing an organic material. Accordingly, the touch buffer layer 251 may prevent or reduce damage to the light emitting element EL, which is susceptible to chemical solution or moisture.

The touch buffer layer 251 may be formed of an organic insulating material capable of being formed at a low temperature equal to or less than a certain temperature (e.g., 100° C.) and having a low dielectric constant of 1 to 3, to prevent or reduce damage to the emission layer LEL containing an organic material that is susceptible to high temperature. For example, the touch buffer layer 251 may be formed of an acrylic-based, epoxy-based, or siloxane-based material. The touch buffer layer 251 having a planarization performance made of an organic insulating material may prevent or reduce damage to the encapsulation layer 220 and cracking of the touch sensor metal formed on the touch buffer layer 251 caused by bending of the organic light emitting display device.

According to a mutual-capacitance-based touch sensor structure, the touch electrodes 255 and 256 may be disposed above the touch buffer layer 251, and the touch electrodes 255 and 256 may be disposed to cross each other.

The touch electrode connection lines 252 and 254 may electrically connect the touch electrodes 255 and 256 to each other. The touch electrode connection lines 252 and 254 and the touch electrodes 255 and 256 may be positioned on different layers with a touch insulating layer 253 interposed therebetween.

The touch electrode connection lines 252 and 254 may be disposed to overlap the bank layer BNK to prevent or reduce a decrease in aperture ratio.

In addition, a portion of the touch electrode connection line 252 may be electrically connected to a touch driving circuit (not shown) through a touch pad PAD beyond the top portion and the side surface of the encapsulation layer 420 and the top portion and the side surface of the dam DAM.

A portion of the touch electrode connection line 252 may receive a touch driving signal from the touch driving circuit, transmit it to the touch electrodes 255 and 256, and may also transmit a touch sensing signal from the touch electrodes 255 and 256 to the touch driving circuit.

A touch passivation layer 257 may be disposed on the touch electrodes 255 and 256. Although the touch passivation layer 257 is shown as being disposed only on the touch electrodes 255 and 256, the present disclosure is not limited thereto, and the touch passivation layer 257 may extend before or after the dam DAM to be disposed on the touch electrode connection line 252.

In addition, a color filter (not shown) may be further disposed on the encapsulation layer 220, and the color filter may be positioned on the touch layer or may be positioned between the encapsulation layer 220 and the touch layer. It is to be noted that although FIG. 2 shows a detailed layer structure of the display panel, but it is only provided by way of example, and the present disclosure is not limited thereto. For example, the layer structure of the display panel may be variously changed, and one or more of the buffer layers or the planarization layers may be omitted when necessary.

The power circuit 140 generates a DC voltage (or constant voltage) required to drive the pixel array of the display panel 100 and the display panel driving circuit by using a DC-DC converter. The DC-DC converter may include a charge pump, a regulator, a buck converter, a boost converter, and the like. The power circuit may generate constant voltages, such as a gamma reference voltage VGMA, a gate-on voltage VGH, a gate-off voltage VGL, a pixel driving voltage EVDD, a cathode voltage EVSS, an initialization voltage Vinit, and the like, by adjusting levels of the DC input voltage that is applied from a host system (not illustrated). The gamma reference voltage VGMA is supplied to the data driving circuit 110. The gate-on voltage VGH and the gate-off voltage VGL are supplied to a level shifter 150 and a gate driving circuit 120. The constant voltages, such as the pixel driving voltage EVDD, the cathode voltage EVSS, and the initialization voltage Vinit, are supplied to the pixel circuits 101 through power lines commonly connected to the pixel circuits 101.

In addition, the pixel driving voltage EVDD may be output from a main power of the host system 200 and may be supplied to the display panel 100. In this case, the power circuit 140 does not need to output the pixel driving voltage EVDD.

The display panel driving circuit writes pixel data of an input image in the pixel circuits of the display panel 100 under the control of a timing controller 130.

The display panel driving circuit includes a data driving circuit 110 and a gate driving circuit 120.

Further, the display panel driving circuit may further include a touch sensor driving circuit (not illustrated) for driving touch sensors. The data driving circuit 110 and the touch sensor driving circuit (not illustrated) may be integrated into one drive integrated circuit (IC). In a mobile device or a wearable device, the timing controller 130, the power circuit 140, the level shifter 150, the data driving circuit 110, and the touch sensor driving circuit (not illustrated) may be integrated into one drive IC.

The data driving circuit 110 receives the pixel data of the input image that is received from the timing controller 130 as a digital signal, and outputs a data voltage. The data driving circuit 110 converts the pixel data of the input image into a gamma compensation voltage for each frame period by using a digital to analog converter (DAC), and outputs the data voltage Vdata. The gamma reference voltage VGMA is divided into a gamma compensation voltage for each gradation through a voltage divider circuit. The gamma compensation voltage for each gradation is provided to the DAC of the data driving circuit 110. The data voltage Vdata is output on each of channels of the data driving circuit 110 through an output buffer.

The data driving circuit 110 may be integrated into a source driver integrated circuit (SDIC). The source driver IC may be connected to a bonding pad of the display panel 100 in a tape automated bonding (TAB) method or a chip on glass (COG) method. Further, the source driver IC may be implemented in a chip on film (COF) method.

The gate driving circuit 120 may be formed on a circuit layer CIR on the display panel 100 together with a TFT array and wirings of a pixel array. The gate driving circuit 120 may be disposed on a bezel that is a non-display area NA of the display panel 100 or may be distributed in the pixel array on which the input image is reproduced.

The gate driving circuit 120 may be disposed in both bezels (BZ) of the display panel with the display area of the display panel interposed therebetween and may supply gate pulses to both sides of gate lines 103 in a double feeding method. In another embodiment, the gate driving circuit 120 may be disposed on either side of the left and right bezels of the display panel 100 and may supply gate signals to the gate lines 103 in a single feeding method. The gate driving circuit 120 sequentially outputs pulses of the gate signals to the gate lines under the control of the timing controller 130. The gate driving circuit 120 may sequentially supply the gate signals to the gate lines 103 by shifting the pulses of the gate signals by using shift registers.

Figure 3:
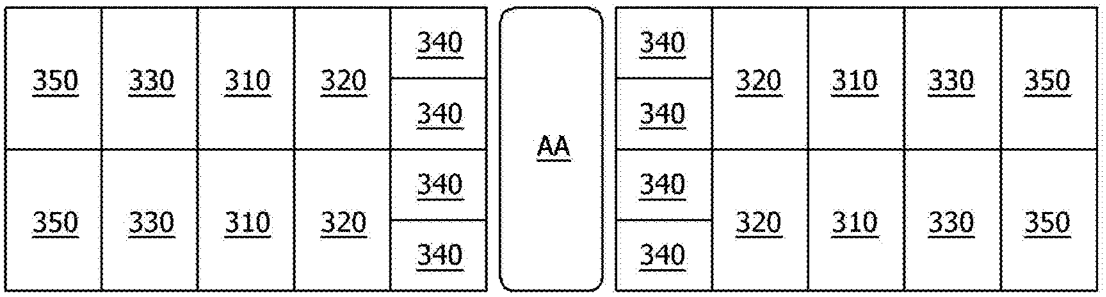
FIG. 3 is a diagram showing a layout structure of a gate driving circuit illustrated in FIG. 1 according to an embodiment of the present disclosure.
Figure 4:
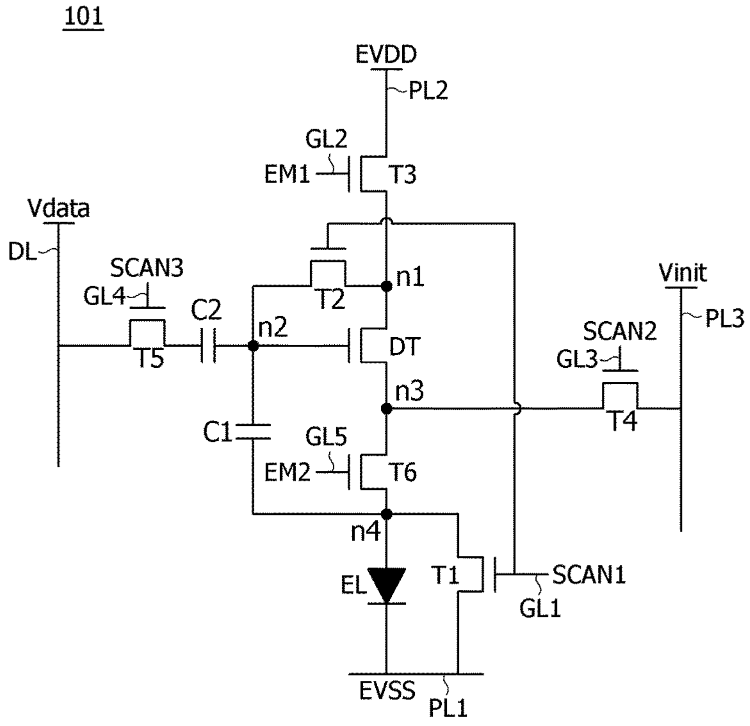
FIG. 4 is a circuit diagram exemplarily illustrating a pixel circuit according to an embodiment of the present disclosure.

The gate driving circuit 120 may include a plurality of gate driving units that output the pulses of the gate signals. In case of the pixel circuit 101 as shown in FIG. 4, the gate driving circuit 120 may include, as shown in FIG. 3, a first gate driving unit 310 that sequentially outputs a first gate signal SCAN1, a second gate driving unit 320 that sequentially outputs a second gate signal EM1, a third gate driving unit 330 that sequentially outputs a third gate signal SCAN2, a fourth gate driving unit 340 that sequentially outputs a fourth gate signal SCAN3, and a fifth gate driving unit 350 that sequentially outputs a fifth gate signal EM2. Here, the plurality of gate driving units may be implemented as shift registers or edge triggers. Some of the plurality of gate driving units may be implemented as the shift registers, and the remainders may be implemented as the edge triggers. Although FIG. 3 shows that the gate driving circuit 120 includes first to fifth gate driving units, the present disclosure is not limited thereto, and more or less gate driving units may be included in the gate driving circuit 120 when necessary.

Here, the second gate signal EM1 and the fifth gate signal EM2 may be emission signals, and the first gate signal SCAN1, the third gate signal SCAN2, and the fourth gate signal SCAN3 may be scan signals.

Between the fifth gate driving unit 350 that outputs the fifth gate signal EM2 which is the emission signal and the second gate driving unit 320, the first gate driving unit 310 that outputs the first gate signal SCAN1 which is the scan signal and the third gate driving unit 330 that outputs the third gate signal SCAN2 may be disposed.

Further, between the first gate driving unit 310 that outputs the first gate signal SCAN1 which is the scan signal and the fourth gate driving unit 340 that outputs the fourth gate signal SCAN3, the second gate driving unit 320 that outputs the second gate signal EM1 which is the emission signal may be disposed. However, the present disclosure is not necessarily limited thereto.

In an embodiment of the present disclosure, the fifth gate driving unit 350 may be disposed on the outermost side of the gate driving circuit 120.

Further, although FIG. 3 illustrates that the gate driving units 320 and 350 that output the emission signals and the gate driving units 310, 330, and 340 that output the scan signals are disposed in left-right symmetry based on the display area AA, the present disclosure is not limited thereto, and the gate driving units 320 and 350 that output the emission signals and the gate driving units 310, 330, and 340 that output the scan signals may be disposed in left-right asymmetry based on the display area AA.

In addition, in FIG. 3, the fourth gate driving unit 340 may be connected to each of the odd pixel line and the even pixel line, and the first gate driving unit 310, the second gate driving unit 320, the third gate driving unit 330, and the fifth gate driving unit 350 may be commonly connected to the two pixel lines.

The timing controller 130 receives image data and a timing signal synchronized with the image data from a host system (not illustrated). The image data received by the timing controller 130 is a digital signal. The timing controller 130 may convert the image data to suit a data format that is used in the data driving circuit 110 and may transmit the converted image data to the data driving circuit 110. Here, the timing signal may include a vertical synchronization signal, a horizontal synchronization signal, a clock signal, and a data enable signal. Since a vertical period and a horizontal period can be known through a method for counting the data enable signal, the vertical synchronization signal and the horizontal synchronization signal may be omitted. The data enable signal has a cycle of one horizontal period (1H).

The timing controller 130 may generate a data timing control signal for controlling an operation timing of the data driving circuit 110, a gate timing control signal for controlling an operation timing of the gate driving circuit 120, and the like based on the timing signal received from the host system (not illustrated).

The gate timing control signal generated from the timing controller 130 may be input to the shift register of the gate driving circuit 120 through the level shifter 150. The level shifter 150 may receive the input gate timing control signal and may generate and provide a start pulse and a shift clock to the gate driving circuit 120.

As described above, the display device including the display panel 100, the display panel driving circuit, and the power circuit 140 may be a display device which secures an enough threshold voltage sampling time of the driving element in case of internal compensation of the pixel circuit 101. This allows the display device to drive at high speeds.

Further, the display device may be a display device in which the number of power lines of the pixel circuit 101 is reduced. This allows the display device to be designed with high resolution.

As described above, in order to secure the enough threshold voltage sampling time in case of the internal compensation of the pixel circuit 101 and to reduce the number of power lines required in case of the internal compensation, the pixel circuit 101 may include the following constitutions.

FIG. 4 is a circuit diagram exemplarily illustrating a pixel circuit according to an embodiment of the present disclosure.

Referring to FIG. 4, a pixel circuit 101 may include a light-emitting element EL, a driving element DT that drives the light-emitting element EL, a first capacitor C1, a second capacitor C2, and a plurality of switch elements T1 to T6. Here, the driving elements DT and the plurality of switch elements T1 to T6 may be N-channel transistors. Further, the N-channel transistor may be implemented as an oxide TFT.

The pixel circuit 101 is connected to a data line DL to which a data voltage Vdata is applied and gate lines GL1 to GL4 to which gate signals SCAN1, SCAN2, SCAN3, EM1, and EM2 are applied.

The pixel circuit 101 is connected to a cathode power line PL1 that supplies a cathode voltage EVSS, a driving power line PL2 that supplies a pixel driving voltage EVDD, and an initialization power line PL3 that supplies an initialization voltage Vinit. On the display panel 100, the power lines PL1, PL2, and PL3 may be commonly connected to all pixels.

The pixel driving voltage EVDD is set as a voltage which is higher than the maximum voltage (Vdata white max) of the data voltage Vdata and at which the driving element DT may operate in a saturation region. The initialization voltage Vinit may be set as a voltage which is lower than the minimum voltage (Vdata black) of the data voltage Vdata and which is higher than the cathode voltage EVSS.

The gate-on voltage VGH may be set as a voltage that is higher than the pixel driving voltage EVDD, and the gate-off voltage VGL may be set as a voltage that is lower than the cathode voltage EVSS.

For example, if the maximum voltage (Vdata white max) of the data voltage Vdata is 6 V, and the minimum voltage (Vdata black) thereof is 1 V, the pixel driving voltage EVDD may be set within the voltage range of 10 V to 16 V. The initialization voltage Vinit may be set within the voltage range of 0.5 V to 1 V, and the cathode voltage EVSS may be set within the voltage range of −8 V to −0.5 V.

The gate-on voltage VGH may be set within the voltage range of 8 V to 24 V, and the gate-off voltage VGL may be set within the voltage range of −5 V to −16 V.

In other words, the levels of the voltages being applied to the pixel circuit 101 may be in the order of gate-on voltage (VGH)>pixel driving voltage (EVDD)>maximum voltage (Vdata white max)>minimum voltage (Vdata black)>initialization voltage (Vinit)>cathode voltage (EVSS)>gate-off voltage (VGL).

The gate signals SCAN1, SCAN2, SCAN3, EM1, and EM2 include swing pulses between the gate-on voltage VGH and the gate-off voltage VGL. The gate signals SCAN1, SCAN2, SCAN3, EM1, and EM2 include the first gate signal SCAN1, the second gate signal EM1, the third gate signal SCAN2, the fourth gate signal SCAN3, and the fifth gate signal EM2.

Figure 5:
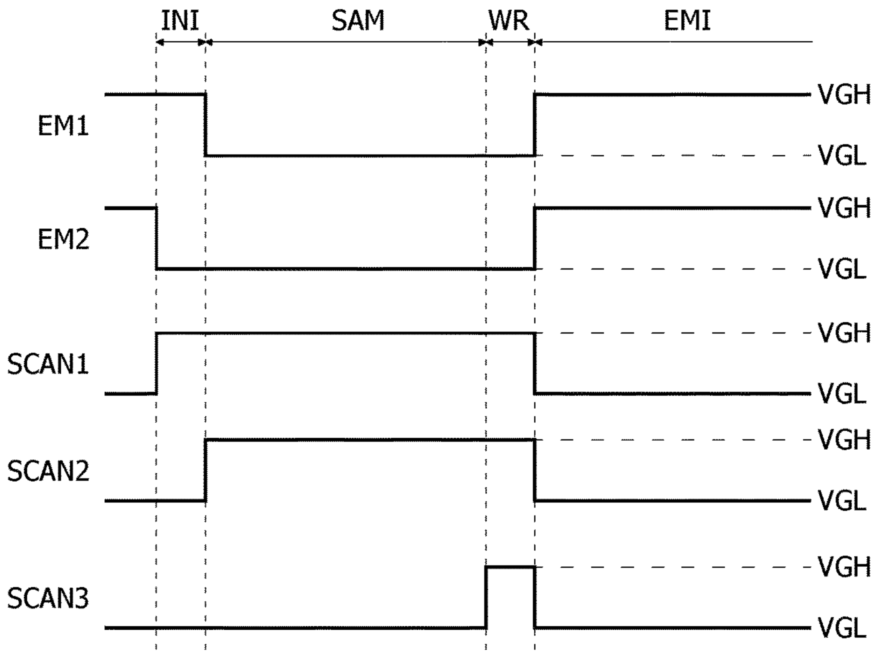
FIG. 5 is a waveform diagram showing waveforms of a gate signal that is applied to a pixel circuit illustrated in FIG. 4 according to an embodiment of the present disclosure.

The driving periods of the pixel circuit 101 may be in the order of an initialization period IN1, a sampling period SAM, a data writing period WR, and an emission period EMI. As illustrated in FIG. 5, the initialization period IN1, the sampling period SAM, the data writing period WR, and the emission period may be determined by waveforms of the gate signals SCAN1, SCAN2, SCAN3, EM1, and EM2.

Specifically, in the initialization period IN1, the voltages of the first gate signal SCAN1 and the second gate signal EM1 are the gate-on voltages VGH. Further, the voltages of the third gate signal SCAN2, the fourth gate signal SCAN3, and the fifth gate signal EM2 are the gate-off voltages VGL.

In the sampling period SAM, the voltages of the first gate signal SCAN1 and the third gate signal SCAN2 are the gate-on voltages VGH. Further, the voltages of the second gate signal EM1, the fourth gate signal SCAN3, and the fifth gate signal EM2 are the gate-off voltages VGL.

In the data writing period WR, the voltages of the first gate signal SCAN1, the third gate signal SCAN2, and the fourth gate signal SCAN3 are the gate-on voltages VGH. Further, the voltages of the second gate signal EM1 and the fifth gate signal EM2 are the gate-off voltages VGL.

In the emission period EMI, the voltages of the second gate signal EM1 and the fifth gate signal EM2 are the gate-on voltages VGH. Further, the voltages of the first gate signal SCAN1, the third gate signal SCAN2, and the fourth gate signal SCAN3 are the gate-off voltages VGL.

In addition, the driving element DT of the pixel circuit 101 drives an emission element EL by generating current in accordance with a gate-source voltage Vgs. The driving element DT includes a first electrode connected to a first node N1, a gate electrode connected to a second node N2, and a second electrode connected to a third node N3. Here, the pixel driving voltage EVDD may be applied to the first node N1, and the data voltage Vdata may be applied to the second node N2. Specifically, in the initialization period IN1 and the emission period, the pixel driving voltage EVDD may be applied to the first node N1, and in the data writing period WR, the data voltage Vdata may be applied to the second node N2.

The emission element EL may be implemented as an OLED. The emission element EL includes the anode electrode and the cathode electrode, and emits light by the current from the driving element DT. Here, the emission element EL may further include an organic compound layer formed between the anode electrode and the cathode electrode.

The anode electrode of the emission element EL is connected to a fourth node N4, and the cathode electrode is connected to a cathode power line PL1 that supplies the cathode voltage EVSS. Here, the fourth node N4 may be selectively connected to a third node N3 by the turn-on and turn-off of the sixth switch element T6.

The organic compound layer may include a hole injection layer HIL, a hole transport layer HTL, an emission layer EML, an electron transport layer ETL, and an electron injection layer EIL, but is not limited thereto. If the voltage is applied to the anode electrode and the cathode electrode of the light-emitting element EL, holes having passed through the hole transport layer HTL and electrons having passed through the electron transport layer ETL move to the emission layer EML, and excitons are formed. In this case, visible light is emitted from the emission layer EML. The light-emitting element EL may be implemented as a tandem structure in which a plurality of emission layers are stacked. The light-emitting element EL having the tandem structure may improve the luminance and lifetime of the pixels.

The first capacitor C1 is connected between the second node N2 and the fourth node N4 and stores a threshold voltage Vth of the driving element DT having been sampled during the sampling period SAM, and maintains the gate-source voltage Vgs of the driving element DT during the emission period EMI.

The second capacitor C2 is connected between the data line DL to which the data voltage Vdata is applied and the second node N2. The second capacitor C2 stores the data voltage Vdata applied through the fifth switch element T5 in the data writing period WR and transfers the stored data voltage to the second node N2.

As a result, the electric potential of the second node N2 in the data writing period WR becomes a voltage obtained by adding the voltage applied to the second node N2 in the sampling period SAM and the data voltage Vdata together.

In case that the second capacitor C2 is not present between the second node N2 and the fourth node N4, the data voltage Vdata may be immediately transferred to the second node N2 in the data writing period WR, and the electric potential of the second node N2 may be reset to the data voltage Vdata.

In other words, the second capacitor C2 may be a buffer capacitor that prevents or reduces the data voltage Vdata from being abruptly transferred to the second node N2 when the data voltage Vdata is transferred. Here, the capacitance of the second capacitor C2 may be smaller than the capacitance of the first capacitor C1. For example, the capacitance of the first capacitor C1 may be 141 femto-Farad (fF), and the capacitance of the second capacitor C2 may be 135 fF.

In addition, the switch elements T1 to T6 of the pixel circuit 101 include the first switch element T1 and the second switch element T2 which are turned on in response to the gate-on voltage VGH of the first gate signal SCAN1, the third switch element T3 which is turned on in response to the gate-on voltage VGH of the second gate signal EM1, the fourth switch element T4 which is turned on in response to the gate-on voltage VGH of the third gate signal SCAN2, the fifth switch element which is turned on in response to the gate-on voltage VGH of the fourth gate signal SCAN3, and the sixth switch element T6 which is turned on in response to the gate-on voltage VGH of the fifth gate signal EM2.

The first switch element T1 is connected between the anode electrode and the cathode electrode of the light-emitting element EL. In other words, the first switch element T1 is connected between the fourth node N4 on the anode electrode side and the cathode power line PL1 on the cathode electrode side.

Specifically, the first electrode of the first switch element T1 is connected to the anode electrode of the light-emitting element EL, for example, the fourth node N4, and the second electrode is connected to the cathode electrode of the light-emitting element EL, for example, the cathode power line PL1. Further, the gate electrode is connected to the first gate line GL1, and the first gate signal SCAN1 is applied to the gate electrode.

The first switch element T1 electrically connects the anode electrode and the cathode electrode to each other in response to the first gate signal SCAN1.

In other words, the first switch element T1 is turned on in response to the gate-on voltage VGH of the first gate signal SCAN1 and applies the cathode voltage EVSS to the fourth node N4.

Here, the first switch element T1 is turned on until the emission period EMI and maintains the electric potential of the fourth node N4 as the cathode voltage EVSS until the emission period EMI.

In other words, since the voltage of the first gate signal SCAN1 is the gate-on voltage VGH during the initialization period IN1, the sampling period SAM, and the data writing period WR, the first switch element T1 is turned on during the initialization period IN1, the sampling period SAM, and the data writing period WR, and maintains the electric potential of the fourth node N4 as the cathode voltage EVSS during the initialization period IN1, the sampling period SAM, and the data writing period WR.

Since the voltage of the first gate signal SCAN1 is the gate-off voltage during the emission period, the first switch element T1 is turned off in accordance with the gate-off voltage in the emission period.

The second switch element T2 is connected between the first node N1 and the second node N2.

Specifically, the first electrode of the second switch element T2 is connected to the first node N1, and the second electrode thereof is connected to the second node N2. Further, the gate electrode is connected to the first gate line GL1, and the first gate signal SCAN1 is applied to the gate electrode.

In other words, the second switch element T2 shares the first gate signal SCAN1 with the first switch element T1.

The second switch element T2 is turned on in response to the gate-on voltage VGH of the first gate signal SCAN1.

Here, the second switch element T2 is turned on until the emission period EMI and maintains the driving element DT in a diode connection state until the emission period EMI.

In other words, since the voltage of the first gate signal SCAN1 is the gate-on voltage VGH during the initialization period IN1, the sampling period SAM, and the data writing period WR, the second switch element T2 is turned on during the initialization period IN1, the sampling period SAM, and the data writing period WR, and maintains the driving element DT in a diode connection state during the initialization period IN1, the sampling period SAM, and the data writing period WR. Here, the diode connection means that the gate electrode of the driving element DT and the first electrode are connected to each other.

Since the voltage of the first gate signal SCAN1 is the gate-off voltage during the emission period, the second switch element T2 is turned off in accordance with the gate-off voltage in the emission period.

The third switch element T3 is connected between the driving power line PL2 that supplies the pixel driving voltage EVDD and the first node N1.

Specifically, the first electrode of the third switch element T3 is connected to the driving power line PL2, and the second electrode thereof is connected to the first node N1. Further, the gate electrode thereof is connected to the second gate line GL2, and the second gate signal EM1 is applied to the gate electrode.

The third switch element T3 is turned on in response to the gate-on voltage VGH of the second gate signal EM1.

Here, since the voltage of the second gate signal EM1 is the gate-on voltage VGH in the initialization period IN1 and the emission period EMI, the third switch element T3 is turned on only during the initialization period IN1, and then is turned off again in the emission period EMI.

The fourth switch element T4 is connected between the initialization power line PL3 that supplies the initialization voltage and the third node N3.

Specifically, the first electrode of the fourth switch element T4 is connected to the initialization power line PL3, and the second electrode thereof is connected to the third node N3. Further, the gate electrode thereof is connected to the third gate line GL3, and the third gate signal SCAN2 is applied to the gate electrode.

The fourth switch element T4 is turned on in response to the gate-on voltage VGH of the third gate signal SCAN2.

Here, since the voltage of the third gate signal SCAN2 is the gate-on voltage VGH in the sampling period SAM and the data writing period WR, the fourth switch element T4 is turned on during the sampling period SAM and the data writing period WR.

The fifth switch element T5 is connected between the data line DL and the second capacitor C2.

Specifically, the first electrode of the fifth switch element T5 is connected to the data line DL, and the second electrode thereof is connected to the second capacitor C2. Further, the gate electrode thereof is connected to the fourth gate line GL4, and the fourth gate signal SCAN3 is applied to the gate electrode.

The fifth switch element T5 is turned on in response to the gate-on voltage VGH of the fourth gate signal SCAN3.

Here, since the voltage of the fourth gate signal SCAN3 is the gate-on voltage VGH in the data writing period WR, the fifth switch element T5 is turned on only during the data writing period WR.

The sixth switch element T6 is connected between the third node N3 and the fourth node N4.

Specifically, the first electrode of the sixth switch element T6 is connected to the third node N3, and the second electrode thereof is connected to the fourth node N4. Further, the gate electrode thereof is connected to the fifth gate line GL5, and the fifth gate signal EM2 is applied to the gate electrode.

The sixth switch element T6 is turned on in response to the gate-on voltage VGH of the fifth gate signal EM2.

Here, since the voltage of the fifth gate signal EM2 is the gate-on voltage VGH in the emission period EMI, the sixth switch element T6 is turned on only during the emission period EMI and connects the third node N3 to the fourth node N4.

If the third node N3 and the fourth node N4 are connected to each other in the emission period EMI, a current path is formed between the cathode power line PL1 and the driving power line PL2, and current may flow to the light-emitting element EL.

Hereinafter, the operation of the pixel circuit 101 will be described step by step in accordance with the driving period of the pixel circuit 101.

Figure 6:
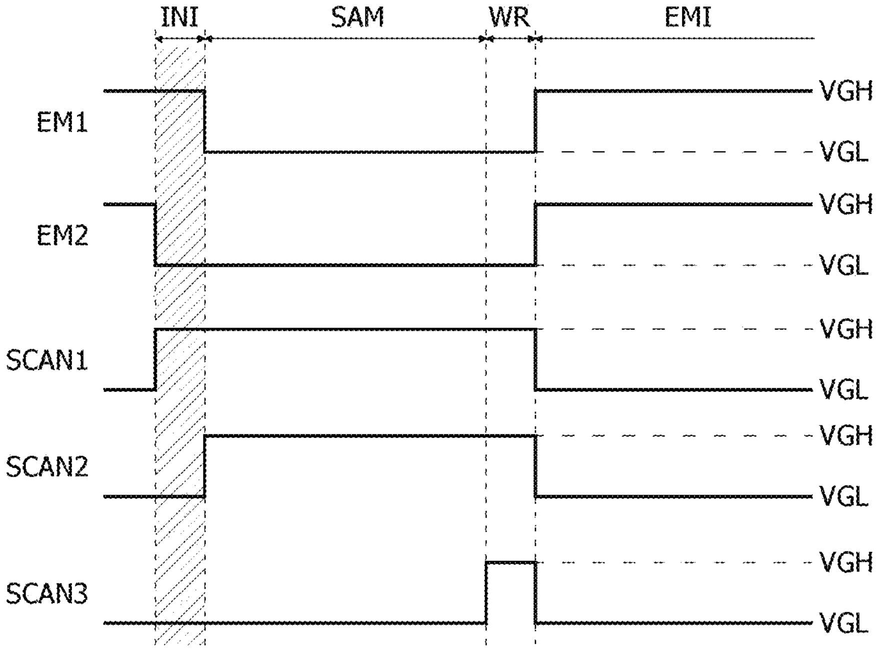
FIGS. 6 and 7 are diagrams showing an initialization period operation of a pixel circuit illustrated in FIG. 4 according to an embodiment of the present disclosure.
Figure 7:
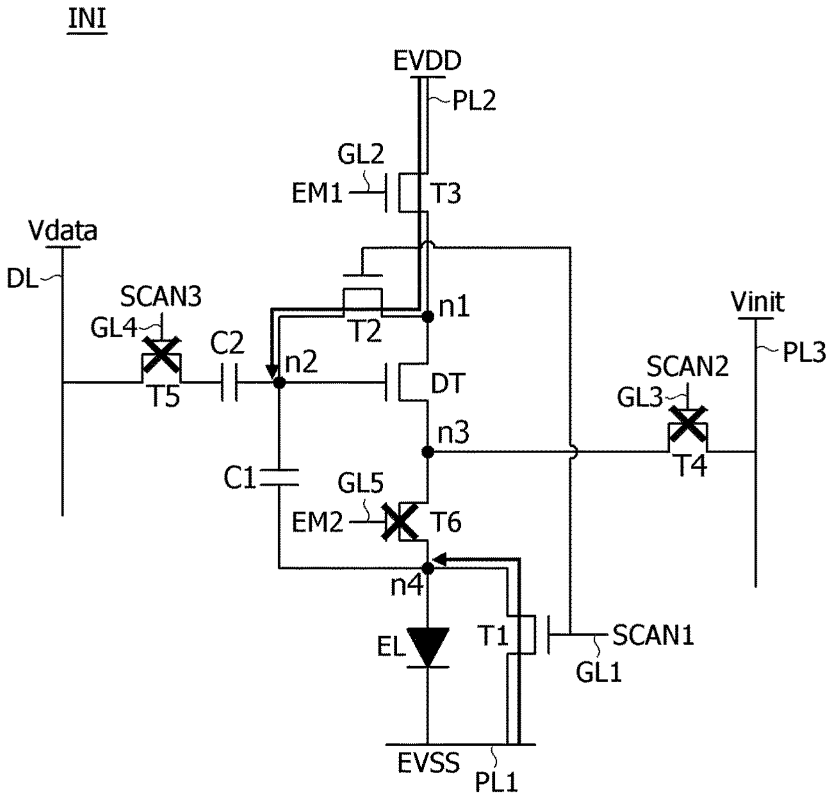
Figure 8:
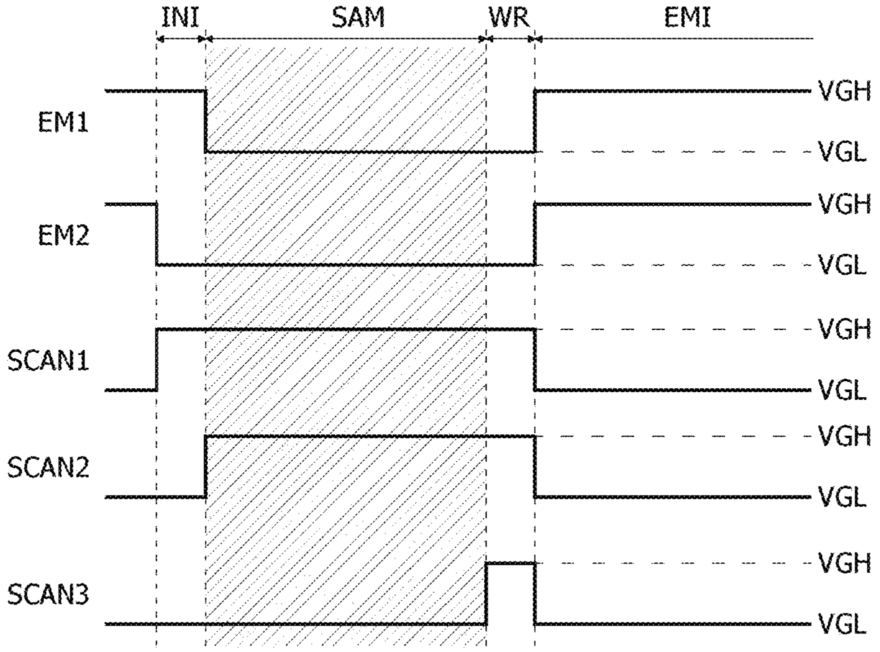
FIGS. 8 and 9 are diagrams showing a sampling period operation of a pixel circuit illustrated in FIG. 4 according to an embodiment of the present disclosure.
Figure 9:
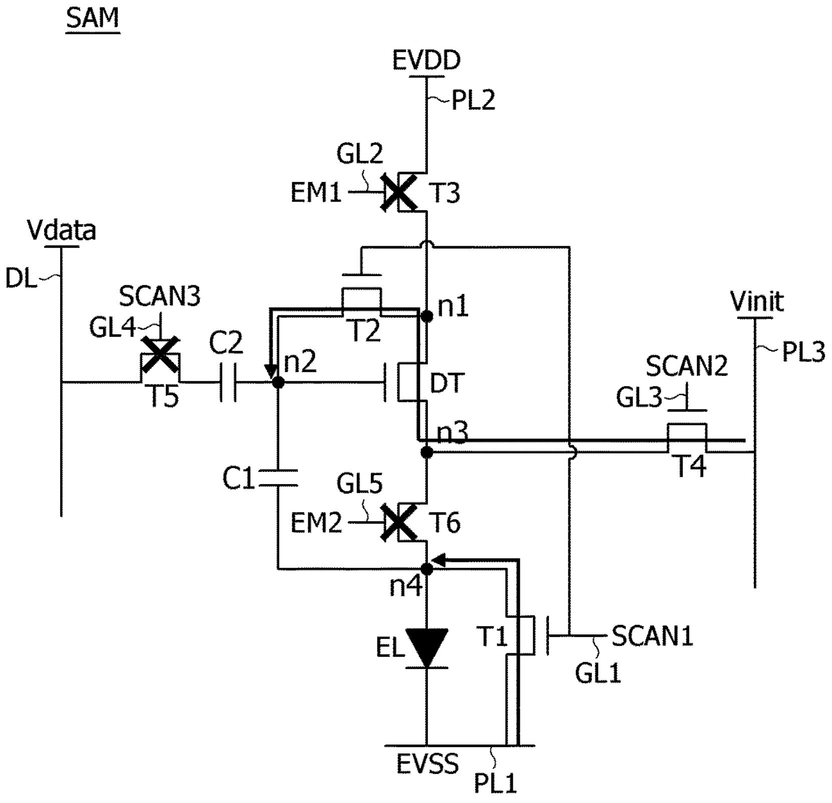
Figure 10:
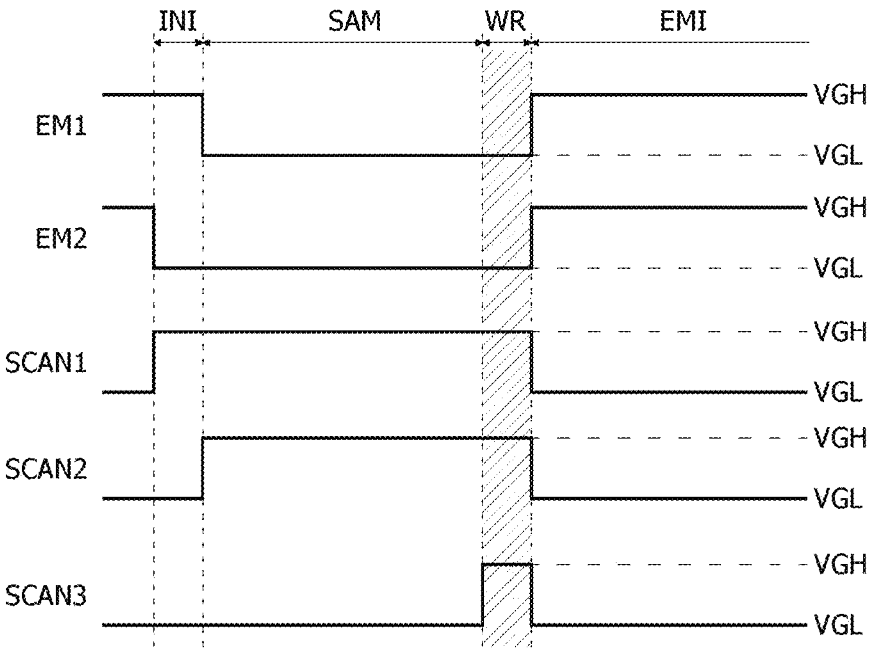
FIGS. 10 and 11 are diagrams showing a data writing period operation of a pixel circuit illustrated in FIG. 4 according to an embodiment of the present disclosure.
Figure 11:
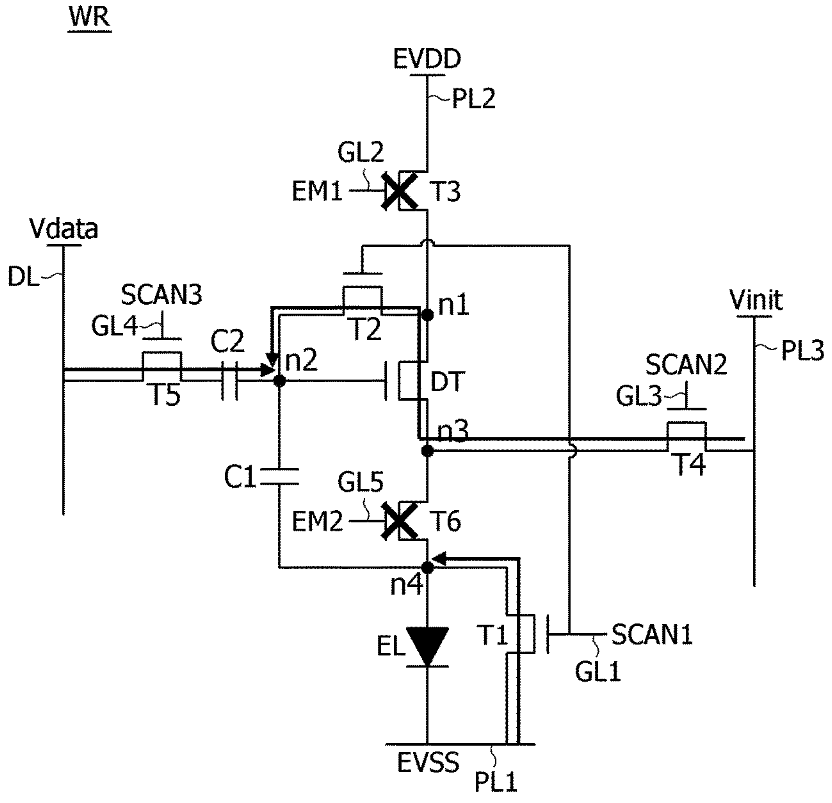
Figure 12:
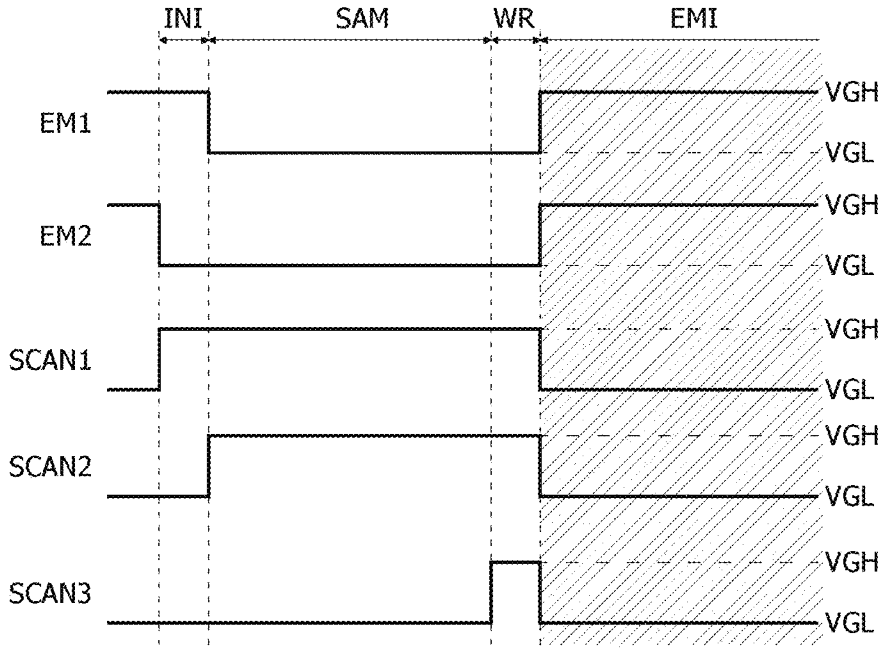
FIGS. 12 and 13 are diagrams showing an emission period operation of a pixel circuit illustrated in FIG. 4 according to an embodiment of the present disclosure.
Figure 13:
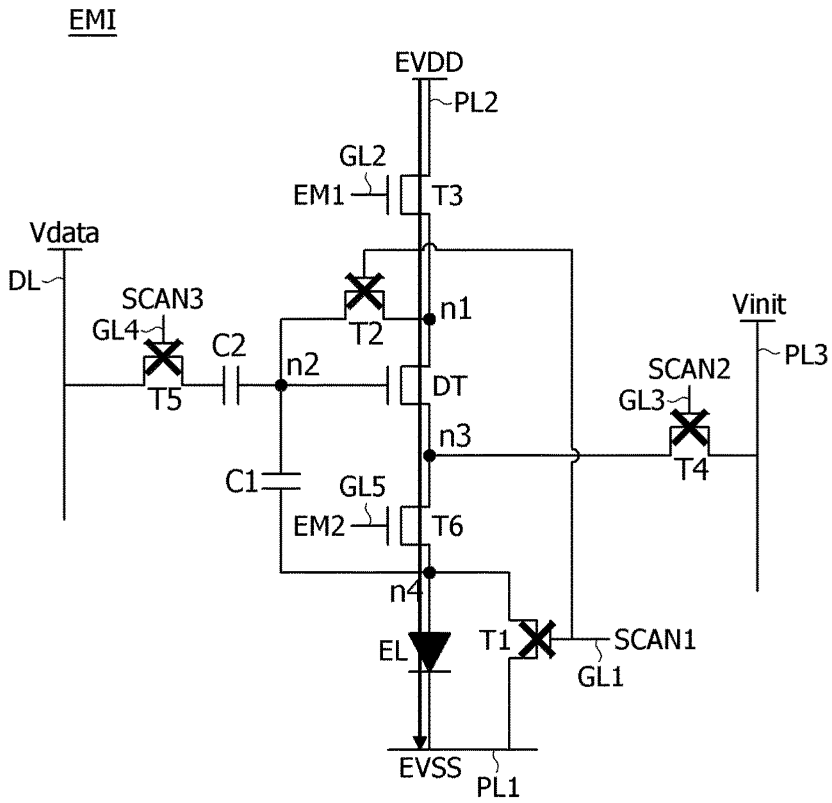

FIGS. 6 and 7 are diagrams showing an initialization period operation of a pixel circuit illustrated in FIG. 4. FIGS. 8 and 9 are diagrams showing a sampling period operation of a pixel circuit illustrated in FIG. 4. FIGS. 10 and 11 are diagrams showing a data writing period operation of a pixel circuit illustrated in FIG. 4. FIGS. 12 and 13 are diagrams showing an emission period operation of a pixel circuit illustrated in FIG. 4.

Referring to FIGS. 6 and 7, main nodes of the pixel circuit 101 are initialized during the initialization period IN1. During the initialization period IN1, the voltages of the first gate signal SCAN1 and the second gate signal EM1 are the gate-on voltages VGH as in FIG. 6. During the initialization period IN1, the voltages of the third gate signal SCAN2, the fourth gate signal SCAN3, and the fifth gate signal EM2 are the gate-off voltages VGL.

Accordingly, during the initialization period IN1, the first switch element T1 and the second switch element T2 are turned on in response to the gate-on voltage VGH of the first gate signal SCAN1 as in FIG. 7, and the third switch element T3 is turned on in response to the gate-on voltage VGH of the second gate signal EM1. Here, by the turn-on of the second switch element T2, the driving element DT becomes in a diode connection state during the initialization period IN1.

In addition, the fourth switch element T4, the fifth switch element T5, and the sixth switch element T6 are turned off in accordance with the gate-off voltages VGL of the third gate signal SCAN2, the fourth gate signal SCAN3, and the fifth gate signal EM2. As a result, in the initialization period IN1, the electric potential of the first node N1 and the second node N2 is initialized to the pixel driving voltage EVDD, and the electric potential of the third node N3 becomes a voltage (EVDD-Vth) obtained by subtracting the threshold voltage Vth of the driving element DT from the pixel driving voltage EVDD.

Further, the electric potential of the fourth node N4 is initialized to the cathode voltage EVSS. In case that a voltage difference between the pixel driving voltage EVDD and the threshold voltage Vth of the driving element DT is higher than the threshold voltage Vth of the driving element DT, the driving element DT may be turned on in the initialization period IN1. In an embodiment of the present disclosure, by applying the cathode voltage EVSS that is a low voltage to the anode electrode of the light-emitting element EL, for example, the fourth node N4, during the initialization period IN1, the light-emitting element EL may be prevented or reduced from emitting light when the second node N2 is initialized with the pixel driving voltage EVDD that is a high voltage. Here, the light emission of the light-emitting element EL is caused by a coupling phenomenon of the first capacitor C1 that occurs when the second node N2 is initialized with the pixel driving voltage EVDD.

Referring to FIGS. 8 and 9, the threshold voltage Vth of the driving element DT is sampled by the first capacitor C1 during the sampling period SAM.

During the sampling period SAM, the voltages of the first gate signal SCAN1 and the third gate signal SCAN2 are the gate-on voltages VGH as in FIG. 8. During the sampling period SAM, the voltages of the second gate signal EM1, the fourth gate signal SCAN3, and the fifth gate signal EM2 are the gate-off voltages VGL.

Accordingly, during the sampling period SAM, the first switch element T1 and the second switch element T2 maintain a turn-on state in response to the gate-on voltage VGH of the first gate signal SCAN1 as in FIG. 9, and the fourth switch element T4 is turned on in response to the gate-on voltage VGH of the third gate signal SCAN2. Here, by the turn-on of the second switch element T2, the driving element DT maintains a diode connection state during the sampling period SAM.

In addition, the third switch element T3, the fifth switch element T5, and the sixth switch element T6 are turned off in accordance with the gate-off voltages VGL of the second gate signal EM1, the fourth gate signal SCAN3, and the fifth gate signal EM2.

As a result, in the sampling period SAM, the electric potential of the first node N1 and the second node N2 becomes a voltage (Vinit+Vth) obtained by adding the initialization voltage Vinit and the threshold voltage Vth of the driving element DT together, and the electric potential of the third node N3 becomes the initialization voltage Vinit. Further, the electric potential of the fourth node becomes the cathode voltage EVSS.

In an embodiment of the present disclosure, by maintaining the electric potential of the fourth node N4 as the cathode voltage EVSS during the sampling period SAM, the voltage of the fourth node N4 may be prevented or reduced from being increased. Accordingly, the light-emitting element EL may be prevented or reduced from emitting light through the voltage increase of the fourth node N4 during the sampling period SAM.

Referring to FIGS. 10 and 11, the data voltage Vdata of the pixel data is applied to the second node N2 during the data writing period WR. Accordingly, the data voltage Vdata in which the threshold voltage Vth of the driving element DT is compensated for may be stored in the first capacitor C1.

During the data writing period WR, the voltages of the first gate signal SCAN1, the third gate signal SCAN2, and the fourth gate signal SCAN3 are the gate-on voltages VGH as in FIG. 10. During the data writing period WR, the voltages of the second gate signal EM1 and the fifth gate signal EM2 are the gate-off voltages VGL.

Accordingly, during the data writing period WR, the first switch element T1 and the second switch element T2 maintain a turn-on state in response to the gate-on voltage VGH of the first gate signal SCAN1 as in FIG. 11, and the fourth switch element T4 maintains a turn-on state in response to the gate-on voltage VGH of the third gate signal SCAN2. Further, the fifth switch element T5 is turned on in response to the gate-on voltage VGH of the fourth gate signal SCAN3. Here, by the turn-on of the second switch element T2, the driving element DT maintains a diode connection state during the data writing period WR.

In addition, the third switch element T3 and the sixth switch element T6 are turned off in accordance with the gate-off voltages VGL of the second gate signal EM1 and the fifth gate signal EM2.

As a result, in the data writing period WR, the electric potential of the first node N1 becomes a voltage (Vinit+Vth) obtained by adding the initialization voltage Vinit and the threshold voltage Vth of the driving element DT together, and the electric potential of the second node N2 becomes a voltage (Vinit+Vth+Vdata) obtained by adding the initialization voltage Vinit, the threshold voltage Vth of the driving element DT, and the data voltage Vdata together. Further, the electric potential of the third node N3 becomes the initialization voltage Vinit, and the electric potential of the fourth node N4 becomes the cathode voltage EVSS.

In an embodiment of the present disclosure, by maintaining the electric potential of the fourth node N4 as the cathode voltage EVSS during the data writing period WR, the voltage of the fourth node N4 can be prevented or reduced from being increased. Accordingly, the light-emitting element EL may be prevented or reduced from emitting light through the voltage increase of the fourth node N4 during the data writing period WR.

Referring to FIGS. 12 and 13, during the emission period EMI, the voltages of the second gate signal EM1 And the fifth gate signal EM2 are the gate-on voltages VGH as in FIG. 12. During the emission period EMI, the voltages of the first gate signal SCAN1, the third gate signal SCAN2, and the fourth gate signal SCAN3 are the gate-off voltages VGL.

Accordingly, during the emission period EMI, the third switch element T3 is turned on in response to the gate-on voltage VGH of the second gate signal EM1 as in FIG. 13, and the sixth switch element T6 is turned on in response to the gate-on voltage VGH of the fifth gate signal EM2.

In addition, the first switch element T1, the second switch element T2, the fourth switch element T4, and the fifth switch element T5 are turned off in accordance with the gate-off voltages VGL of the first gate signal SCAN1, the third gate signal SCAN2, and the fourth gate signal SCAN3.

In accordance with the turn-on and turn-off of the switch elements as described above, a current path is formed between the cathode power line PL1 and the driving power line PL2 in the emission period EMI, and the light-emitting element EL may emit light by the current that follows through the driving element DT. Here, the light-emitting element EL may emit light with the brightness corresponding to the gradation value of the pixel data.

In addition, in the emission period EMI, the electric potential of the first node N1 becomes the pixel driving voltage EVDD, and the electric potential of the second node N2 becomes a voltage (Vinit+Vth+Vdata) obtained by adding the initialization voltage Vinit, the threshold voltage Vth of the driving element DT, and the data voltage Vdata together. Further, the electric potential of the third node N3 and the fourth node N4 becomes the initialization voltage Vinit.

Further, the current Ioled that flows to the light-emitting element EL during the emission period EMI is determined by the following Equation.

$$I_{oled} = K(Vgs - Vth)^2 = K(Vinit + Vth + V\text{ data} - Vinit - Vth)^2 = K(V\text{ data})^2 \quad \text{[Equation 1]}$$

Here, Vgs is a gate-source voltage of a driving element DT, and K means a constant value that is determined by mobility and parasitic capacitance of a driving element DT. Further, Vinit means an initialization voltage, Vdata means a data voltage, and Vth means a threshold voltage of a driving element DT.

Since in the emission period EMI, the electric potential of the second node N2 that is a gate-side node of the driving element DT is Vinit+Vth+Vdata, and the electric potential of the third node N3 or the fourth node N4, which is a source-side node, is Vinit, the gate-source voltage becomes Vinit+Vth+Vdata-Vinit.

As in Equation 1 above, in the current Ioled that flows to the light-emitting element EL, the threshold voltage Vth of the driving element DT is not reflected, but only the data voltage Vdata is reflected. In other words, the current Ioled that flows to the light-emitting element EL is the current in which the threshold voltage Vth of the driving element DT is compensated for.

In addition, during the emission period EMI, one or more of the second gate signal EM1 and the fifth gate signal EM2 may be generated as pulse width modulation (PWM) pulses. The PWM pulse may have a duty ratio that is changed in accordance with a digital brightness value (DBV).

As described above, in the pixel circuit 101 according to an embodiment of the present disclosure, the sampling period SAM and the data writing period WR are separated from each other. Accordingly, the sampling period SAM can be sufficiently secured regardless of one horizontal period (1H) corresponding to the data writing period WR.

Further, in the pixel circuit 101 according to an embodiment of the present disclosure, since the electric potential of the anode electrode of the light-emitting element EL, for example, the fourth node N4, is maintained as the cathode voltage EVSS until the emission period EMI by the first switch element T1, it is not needed to dispose a separate low-voltage power line, such as a reference voltage line VREF in the pixel circuit 101. Accordingly, it is possible to reduce the number of power lines that are necessary for the pixel circuit 101.

Figure 14:
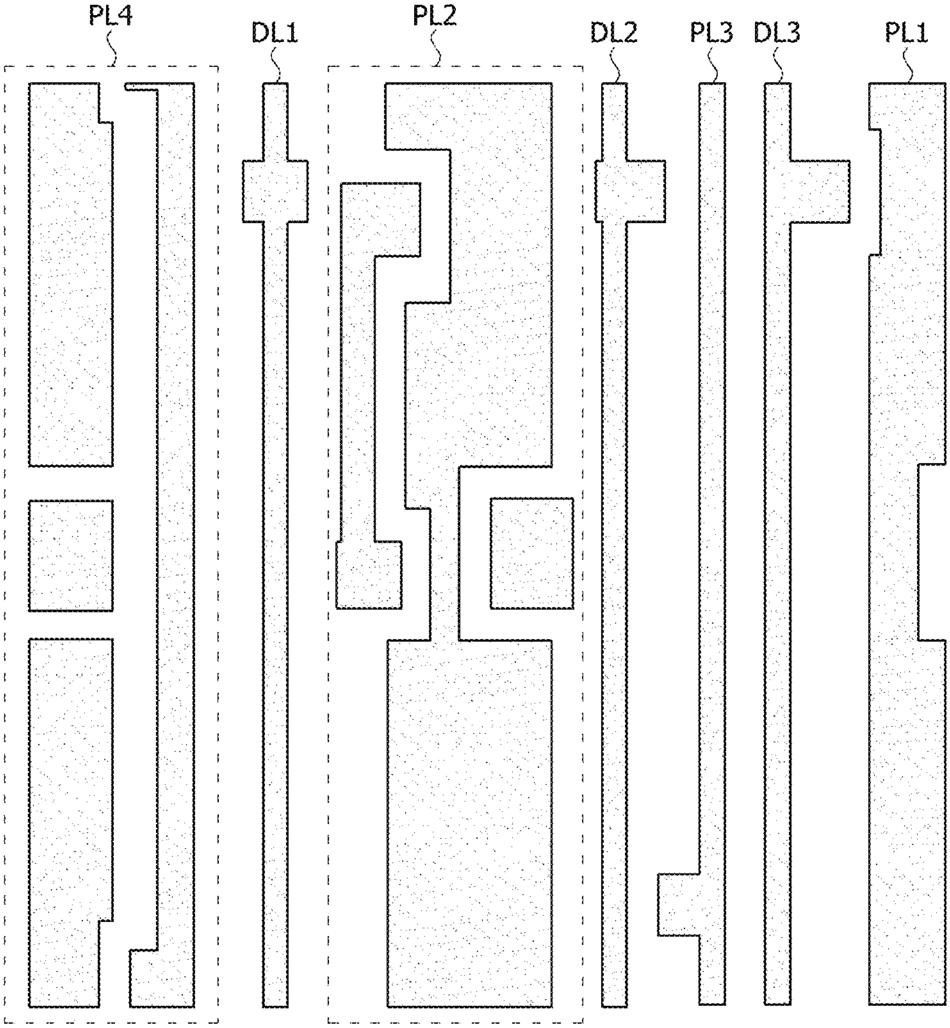
FIG. 14 is a diagram exemplarily illustrating a metal layer on which power lines of a pixel circuit including a separate low-voltage power line are formed according to an embodiment of the present disclosure.

In other words, if a separate low-voltage power line, such as the reference voltage line VREF, is disposed in the pixel circuit, the area that is occupied by the power lines is increased in the pixel circuit as in FIG. 14. Due to this, the size of the pixel circuit is increased, and thus the high-resolution design of the display device becomes difficult. In FIG. 14, the power lines may be the first data line DL1, the cathode power line PL1 disposed between the second data line DL2 and the third data line DL3, the driving power line PL2, the initialization power line PL3, and the reference voltage line PL4.

Figure 15:
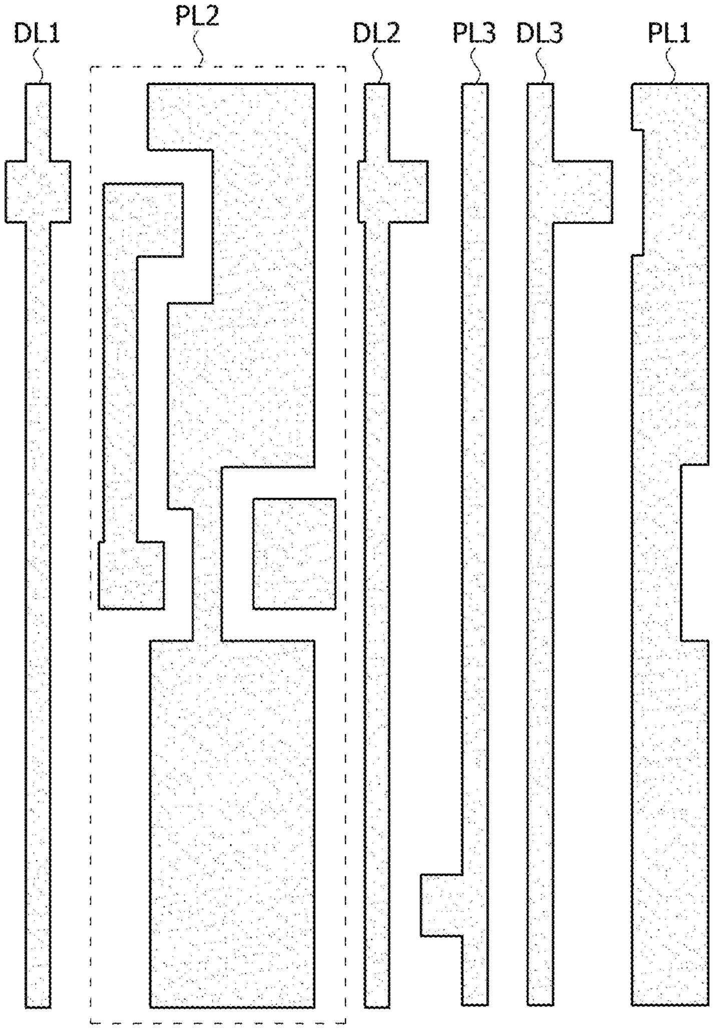
FIG. 15 is a diagram exemplarily illustrating a metal layer on which power lines of a pixel circuit are formed according to an embodiment of the present disclosure.

In contrast, if the separate low-voltage power line, such as the reference voltage line PL4, is not disposed in the pixel circuit, the area that is occupied by the power lines is reduced in the pixel circuit as in FIG. 15. Due to this, the size of the pixel circuit is reduced, and thus the high-resolution design of the display device is facilitated. In FIG. 15, the power lines may be the first data line DL1, the cathode power line PL1 disposed between the second data line DL2 and the third data line DL3, the driving power line PL2, and the initialization power line PL3.

It is to be noted that the structure of the pixel circuit 101 shown in FIG. 4 and the driving timings of the pixel circuit 101 shown in FIG. 5 are provided by way of example only, and the present disclosure is not limited thereto. For example, more or less transistors and capacitors could be included in the pixel circuit of the present disclosure, and the driving method thereof may be variously changed.

From now on, a constitution for connecting the first switch element T1 and the cathode power line PL1 to each other in the pixel circuit 101 according to an embodiment of the present disclosure will be described.

Figure 16:
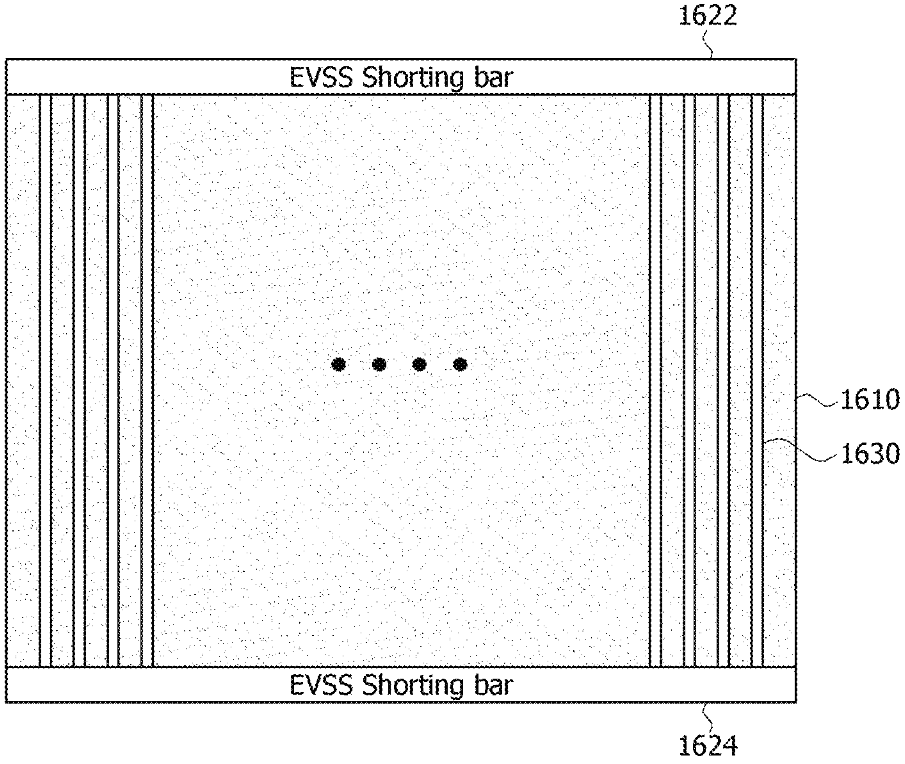
FIG. 16 is a diagram schematically illustrating a constitution in which a cathode power line is disposed on a display panel according to an embodiment of the present disclosure.
Figure 17:
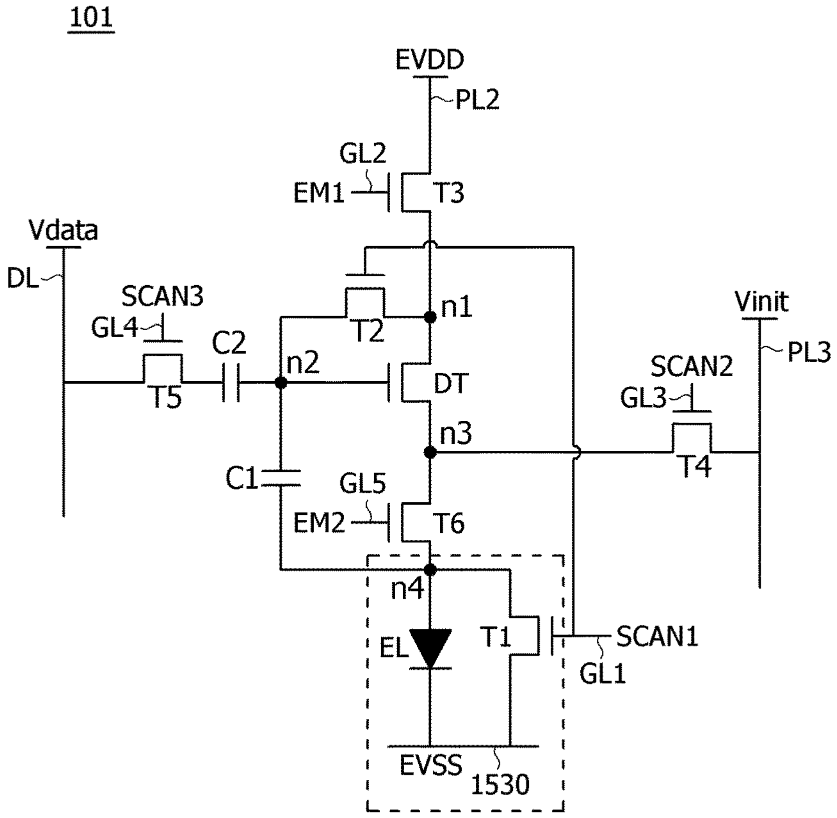
FIGS. 17 and 18 are diagrams explaining a constitution in which a first switch element of a pixel circuit is connected to a cathode power line according to an embodiment of the present disclosure.
Figure 18:
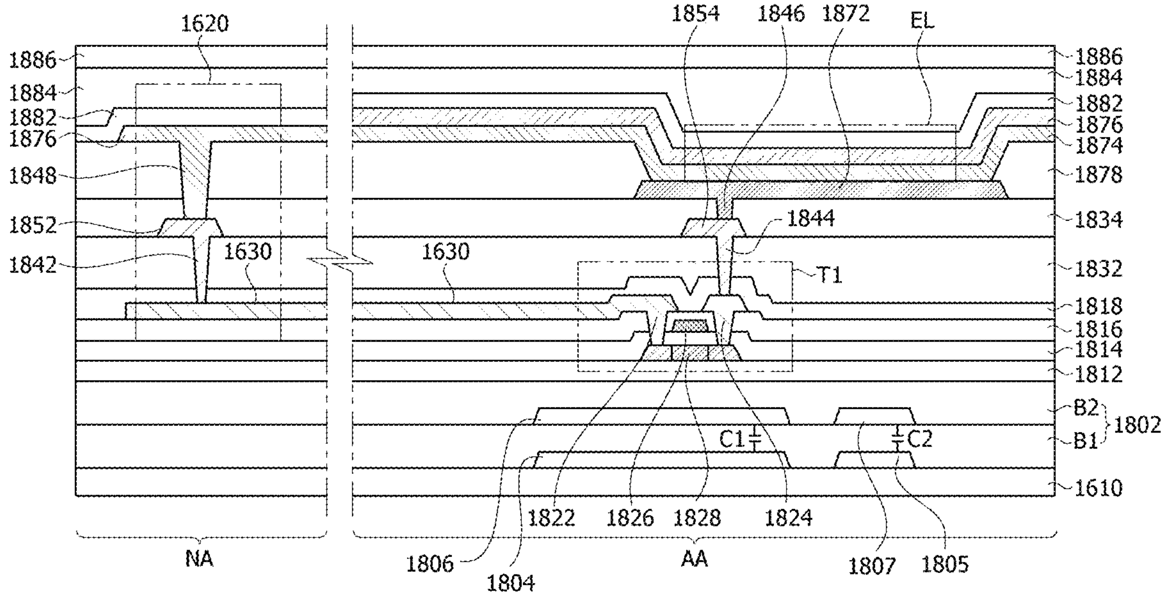

FIG. 16 is a diagram schematically illustrating a constitution in which a cathode power line is disposed on a display panel, and FIGS. 17 and 18 are diagrams explaining a constitution in which a first switch element of a pixel circuit according to an embodiment of the present disclosure is connected to a cathode power line.

Referring to FIG. 16, on one side of a substrate 1610 for forming a display panel 100, a first shorting bar 1622 (EVSS Shorting bar) may be disposed, and on the other side of the substrate 1610, a second shorting bar 1624 (EVSS Shorting bar) may be disposed. Here, one side and the other side of the substrate 1610 may correspond to a non-display area NA of the display panel 100. In other words, on one side of the non-display area NA, the first shorting bar 1622 may be disposed, and on the other side of the substrate 1610, the second shorting bar 1624 may be disposed.

Further, a plurality of cathode power lines 1630 may be disposed between the first shorting bar 1622 and the second shorting bar 1624.

In other words, one end of each of the cathode power lines 1630 may be connected to the first shorting bar 1622, and the other end of each of the cathode power lines 1630 may be connected to the second shorting bar 1624. Here, the cathode power lines 1630 may be disposed in a display area AA of the display panel 100.

In addition, as shown in a dotted line display part of FIG. 17, the first electrode of the first switch element T1 of the pixel circuit 101 is connected to the cathode power line 1630, and the second electrode thereof is connected to the fourth node N4, for example, the anode electrode of the light-emitting element EL.

In the cross-sectional structure of the display panel 100 as in FIG. 18, the first switch element T1 may be disposed within a plurality of insulating layers.

Specifically, the plurality of insulating layers may include a first insulating layer 1812 that covers a multi-buffer layer 1802 stacked on the substrate 1610 of the display panel 100, a second insulating layer 1814 that covers the first insulating layer 1812, and a third insulating layer 1816 that covers the second insulating layer 1814. Here, the multi-buffer layer 1802 may block moisture and the like that may infiltrate from outside. The multi-buffer layer 1802 may be constituted by stacking silicon oxide SiOx and silicon nitride SiNx in multiple layers, but is not limited thereto.

The multi-buffer layer 1802 may include a first buffer layer B1 and a second buffer layer B2. A first-first metal layer 1804 and a first-second metal layer 1805 may be formed on the first buffer layer B1. Further, a second-first metal layer 1806 and a second-second metal layer 1807 may be formed on the second buffer layer B2. The first capacitor C1 may be formed by the first-first metal layer 1804, the second-first metal layer 1806, and the first buffer layer B1 that is a dielectric material disposed therebetween. Further, the second capacitor C2 may be formed by the second-first metal layer 1806, the second-second metal layer 1807, and the first buffer layer B1 that is a dielectric material disposed therebetween.

Any one of the first-first metal layer 1804 and the second-first metal layer 1806 may be electrically connected to the second node n2, and the other thereof may be electrically connected to the fourth node n4.

Any one of the second-first metal layer 1806 and the second-second metal layer 1807 may be electrically connected to the second electrode of the fifth switch element T5, and the other thereof may be electrically connected to the second node n2.

A first electrode 1822 and a second electrode 1824 of the first switch element T1 may be disposed on the third insulating layer 1816. Further, a gate electrode 1826 of the first switch element T1 may be disposed on the second insulating layer 1814, and a semiconductor layer 1828 may be disposed on the first insulating layer 1812. Here, the semiconductor layer 1828 may be made of oxide semiconductor. The oxide semiconductor material may include at least one of an IGZO (InGaZnO)-based oxide semiconductor material, an IZO (InZnO)-based oxide semiconductor material, an IGZTO (InGaZnSnO)-based oxide semiconductor material, an ITZO (InSnZnO)-based oxide semiconductor material, an ITZO (InSnZnO)-based oxide semiconductor material, a FIZO (FeInZnO)-based oxide semiconductor material, a ZnO-based oxide semiconductor material, a SIZO (SiInZnO)-based oxide semiconductor material, and a ZnON (Zn-Oxynitride)-based oxide semiconductor material.

In addition, the first electrode 1822 and the second electrode 1824 disposed on the third insulating layer 1816 may be covered by a protective layer 1818 composed of an insulating layer.

A first planarization layer 1832 may cover the protective layer 1818. Further, a second planarization layer 1834 may cover the first planarization layer 1832.

The first planarization layer 1832 may planarize an upper part of the first switch element T1, and may protect the first switch element T1.

The second planarization layer 1834 may cover the first planarization layer 1832. Further, the light-emitting element EL may be disposed on the second planarization layer 1834. Here, the light-emitting element EL may include an anode electrode 1872, an organic compound layer 1874, a cathode electrode 1876, and a bank layer 1878, but is not limited thereto.

Here, the bank layer 1878 may expose the anode electrode 1872. By the bank layer 1878, the size and the shape of an emission area in each of the pixel circuits may differ. The bank layer 1878 may be formed of an organic insulation material having photosensitivity or a material including black, but is not limited thereto. The bank layer 1878 may be made of at least one of an inorganic insulation material, such as silicon nitride (SiNx) or silicon oxide (SiOx), or an organic insulation material, such as BCB (BenzoCycloButene), acryl resin, epoxy resin, or polyimide resin. The bank layer 1878 may be disposed to cover an edge part of the anode electrode 1872 on the second planarization layer 1834.

The organic compound layer 1874 including an emission layer of the light-emitting element EL may cover the anode electrode 1872 and the bank layer 1878. The cathode electrode 1876 of the light-emitting element EL may be disposed on the organic compound layer 352. The cathode electrode 1876 may be formed of a metal layer having the same or similar area as or to the area of the substrate 1610, and a plurality of pixel circuits may commonly use the cathode electrode 1876.

An encapsulation layer may be disposed on the cathode electrode 1876, and a touch sensor layer may be disposed on the encapsulation layer. Here, the encapsulation layer may be composed of at least two stacked insulating layers 1882, 1784, and 1786 including inorganic membranes and organic membranes.

In the cross-sectional structure of the display panel 100 as described above, the cathode power line 1630 may be connected to the second electrode 1824 of the first switch element T1 on the third insulating layer 1816.

In other words, the cathode power line 1630, and the first electrode 1822 and the second electrode 1824 of the first switch element T1 may be disposed on the third insulating layer 1816. Further, the cathode power line 1630, the first electrode 1822, and the second electrode 1824 may be covered by the protective layer 1818 composed of an insulating layer.

Here, the first electrode 1822 and the second electrode 1824 of the first switch element T1 may be located on the display area AA of the display panel 100.

Further, the cathode power line 1630 connected to the second electrode 1824 may extend up to the non-display area NA of the display panel 100.

In the non-display area NA, the cathode power line 1630 may come in contact with a first connection electrode 1852 through a first contact hole 1842 that penetrates the first planarization layer 1832. Here, the first connection electrode 1852 may be disposed on the first planarization layer 1832, and may be covered by the second planarization layer 1834.

The cathode electrode 1876 located in the non-display area NA may come in contact with the first connection electrode 1852 through a fourth contact hole 1848 that penetrates the bank layer 1860 and the second planarization layer 1834.

Through the above-described constitution, the cathode power line 1630 connected to the second electrode 1824 may be connected to the cathode electrode 1876. In other words, the second electrode 1824 and the cathode electrode 1876 may be connected to each other through the above-described constitution. Here, the first shorting bar 1622 or the second shorting bar 1624 may be composed of the first contact hole 1842, the first connection electrode 1852, and the fourth contact hole 1848 located in the non-display area NA.

In addition, a second connection electrode 1854 may come in contact with the first electrode 1822 of the first switch element T1 through a second contact hole 1844 that penetrates the first planarization layer 1832. Here, the second connection electrode 1854 may also be disposed on the first planarization layer 1832, and may be covered by the second planarization layer 1834.

In the display area AA, the anode electrode 1872 disposed on the second planarization layer 1834 may come in contact with the second connection electrode 1854 through the second contact hole 1846 that penetrates the second planarization layer 1834.

Through the above-described constitution, the second electrode 1824 and the anode electrode 1872 may be connected to each other. Here, the anode electrode 1872 may correspond to the fourth node N4.

In addition, in an embodiment of the present disclosure, although it is described that the switch elements T1 to T6 of the pixel circuit 101 are composed of N-channel transistors, the present disclosure is not limited thereto.

In other words, one or more of the switch elements T1 to T6 may be composed of P-channel transistors.

Figure 19:
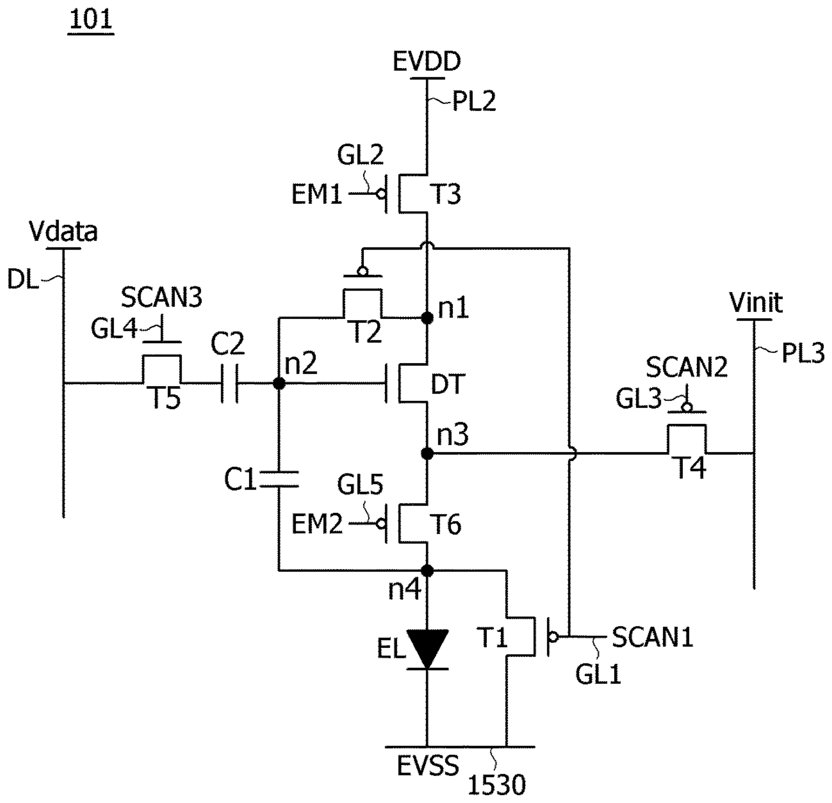
FIGS. 19 to 24 are diagrams explaining various combinations of switch elements in a pixel circuit according to an embodiment of the present disclosure.

For example, as in FIG. 19, the first switch element T1, the second switch element T2, the third switch element T3, the fourth switch element T4, and the sixth switch element T6 may be composed of the P-channel transistors, and the fifth switch element T5 may be composed of the N-channel transistor.

Figure 20:
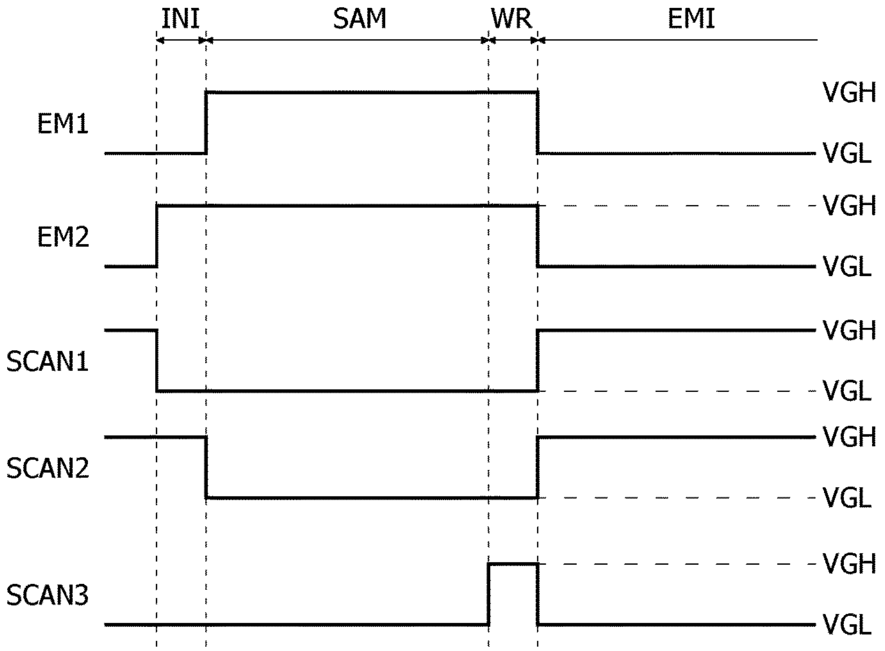

In this case, as in FIG. 20, the gate-on voltages of the first gate signal SCAN1, the second gate signal EM1, the third gate signal SCAN2, and the fifth gate signal EM2 may be gate-low voltages VGL, and the gate-off voltages thereof may be gate-high voltages VGH.

Figure 21:
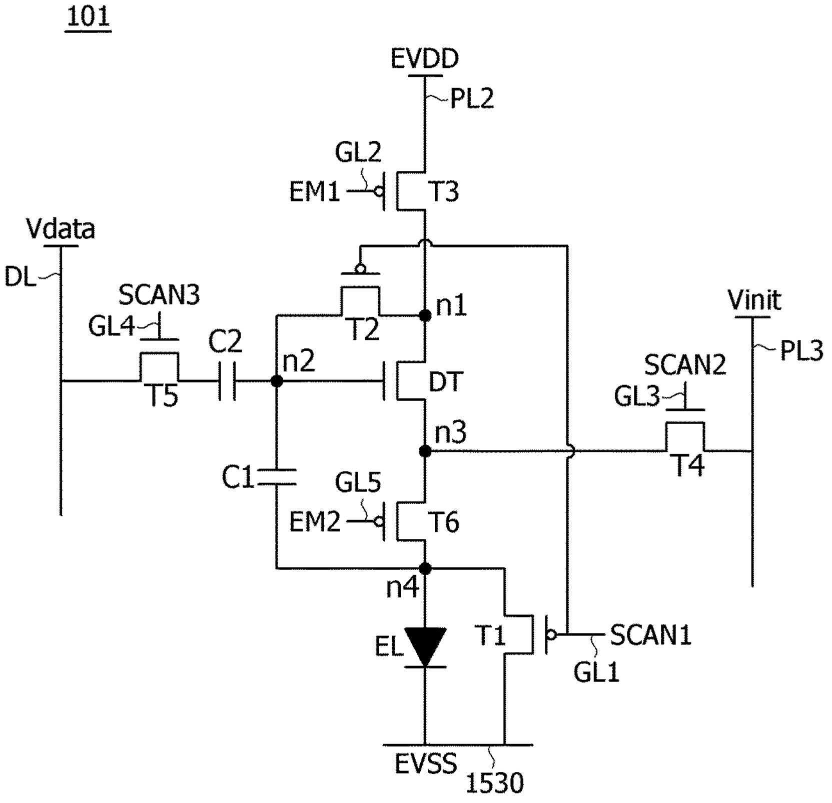

In another example, as in FIG. 21, the first switch element T1, the second switch element T2, the third switch element T3, and the sixth switch element T6 may be composed of the P-channel transistors, and the fourth switch element T4 and the fifth switch element T5 may be composed of the N-channel transistors.

Figure 22:
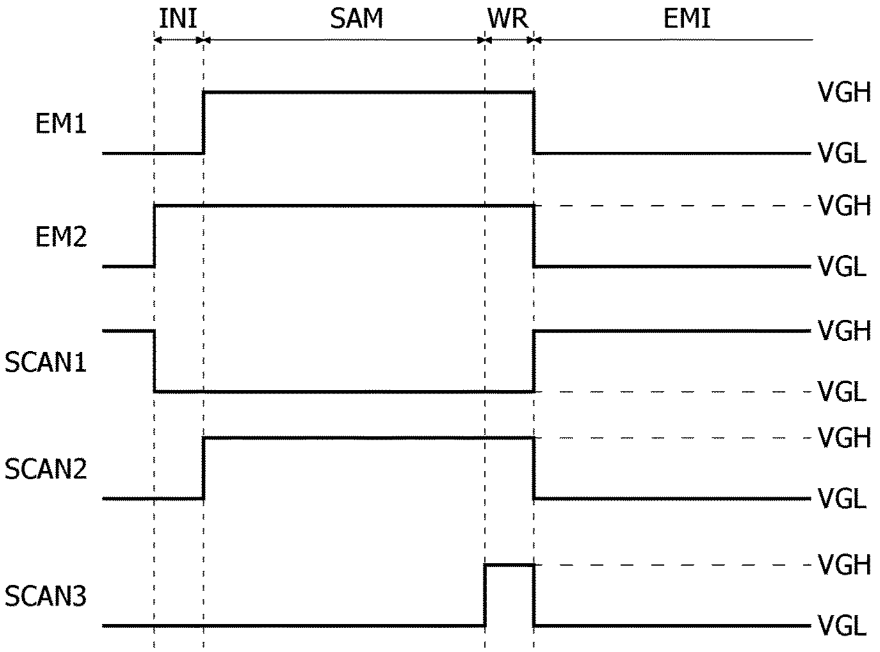

In this case, as in FIG. 22, the gate-on voltages of the first gate signal SCAN1, the second gate signal EM1, and the fifth gate signal EM2 may be gate-low voltages VGL, and the gate-off voltages thereof may be gate-high voltages VGH.

Figure 23:
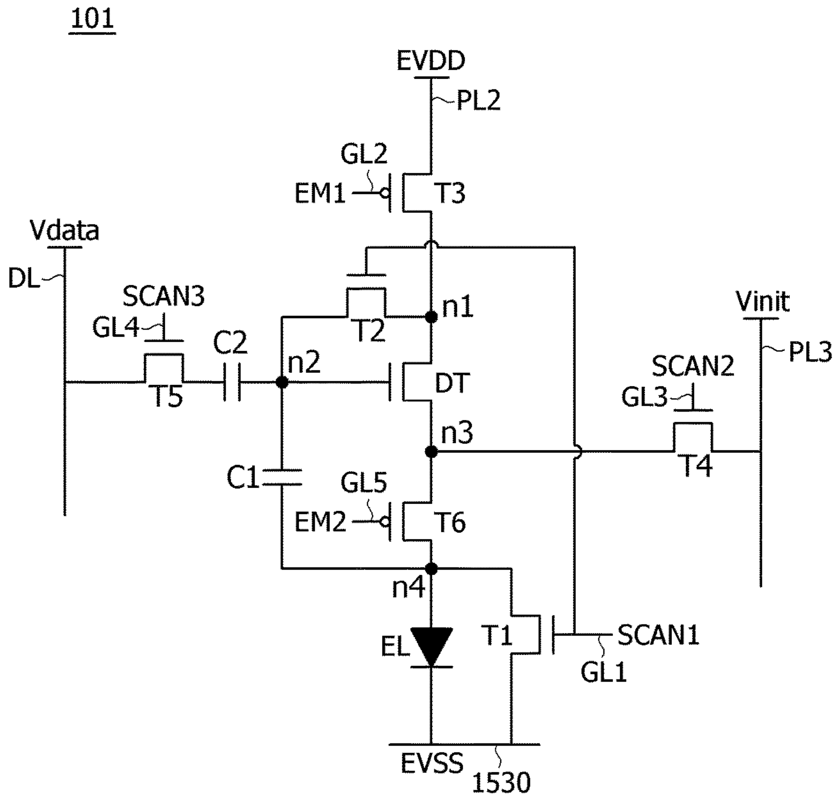

In still another example, as in FIG. 23, the third switch element T3 and the sixth switch element T6 may be composed of P-channel transistors, and the first switch element T1, the second switch element T2, the fourth switch element T4, and the fifth switch element T5 may be composed of N-channel transistors.

Figure 24:
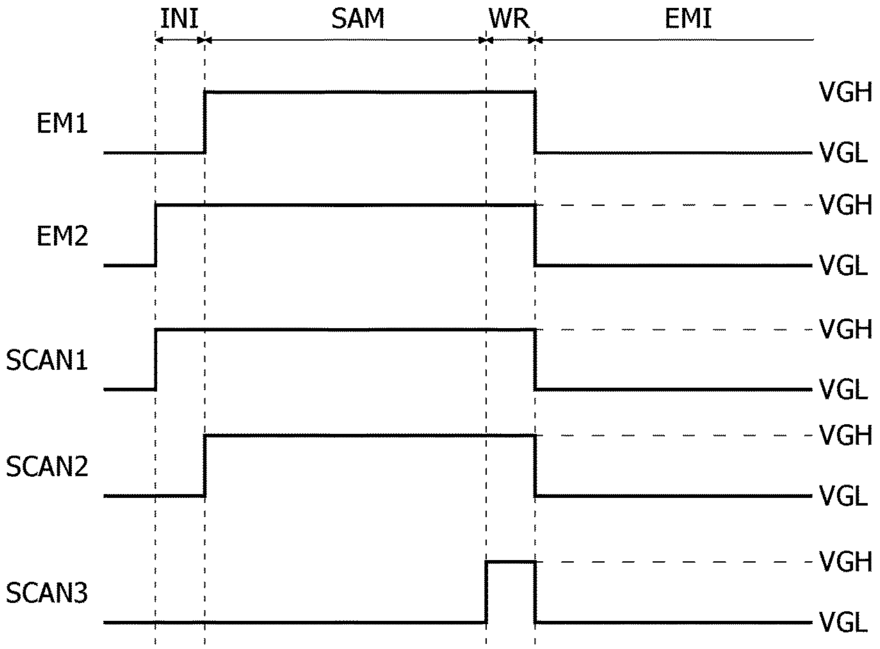

In this case, as in FIG. 24, the gate-on voltages of the second gate signal EM1 and the fifth gate signal EM2 may be the gate-low voltages VGL, and the gate-off voltages thereof may be the gate-high voltages VGH.

The objects to be achieved by the present disclosure, the means for achieving the objects, and effects of the present disclosure described above do not specify essential features of the claims, and thus, the scope of the claims is not limited to the disclosure of the present disclosure.

Although the embodiments of the present disclosure have been described in more detail with reference to the accompanying drawings, the present disclosure is not limited thereto and may be embodied in many different forms without departing from the technical concept of the present disclosure. Therefore, the embodiments disclosed in the present disclosure are provided for illustrative purposes only and are not intended to limit the technical concept of the present disclosure. The scope of the technical concept of the present disclosure is not limited thereto. Therefore, it should be understood that the above-described embodiments are illustrative in all aspects and do not limit the present disclosure. The protective scope of the present disclosure should be construed based on the following claims, and all the technical concepts in the equivalent scope thereof should be construed as falling within the scope of the present disclosure.

[Description of Reference Numerals]

| | |
|---|---|
| 100: display panel | 101: pixel circuit |
| 102: data line | 103: gate line |
| 110: data driving circuit | 120: gate driving circuit |
| 130: timing controller | 140: power circuit |
| 150: level shifter | 1510: substrate |
| 1520: shorting bar | 1530: cathode power line |
| 1610: cathode metal layer | 1810: contact hole |
| 1820: first connection electrode | 1830: second connection electrode |
| 1840: anode electrode | |

What is claimed is:

1. A pixel circuit comprising:

a driving element including a first electrode connected to a first node to which a pixel driving voltage is applied, a gate electrode connected to a second node to which a data voltage is applied, and a second electrode;

a light-emitting element including an anode electrode and a cathode electrode, the light-emitting element configured to emit light by current from the driving element;

a first switch element connected to the anode electrode and the cathode electrode, the first switch element configured to electrically connect the anode electrode and the cathode electrode to each other in response to a first gate signal; and a second switch element connected to the first node and the second node, the second switch element configured to electrically connect the first node and the second node to each other in response to the first gate signal, wherein the pixel circuit is configured to be driven in an order of an initialization period, a sampling period, a data writing period, and an emission period, and wherein the first gate signal is a gate-on voltage during the initialization period, the sampling period, and the data writing period, and is a gate-off voltage during the emission period.

2. The pixel circuit of claim 1, wherein the first switch element is configured to be turned on until the light-emitting element emits the light by the current and maintain an electrical connection of the anode electrode and the cathode electrode to each other until the light-emitting element emits the light.

3. The pixel circuit of claim 1, wherein the first switch element is configured to be turned on in response to the gate-on voltage of the first gate signal and electrically connect the anode electrode and the cathode electrode to each other, and to be turned off in response to the gate-off voltage of the first gate signal.

4. The pixel circuit of claim 1, further comprising:

a first capacitor connected to a fourth node that is connected to the anode electrode and the second node;

a third switch element configured to be turned on in response to a gate-on voltage of a second gate signal and electrically connects a driving power line that supplies the pixel driving voltage and the first node to each other;

a fourth switch element configured to be turned on in response to a gate-on voltage of a third gate signal and electrically connects a third node connected to the second electrode of the driving element and an initialization power line that supplies an initialization voltage to each other;

a second capacitor connected to a data line to which the data voltage is applied and the second node;

a fifth switch element configured to be turned on in response to a gate-on voltage of a fourth gate signal and electrically connects the data line and the second capacitor to each other; and a sixth switch element configured to be turned on in response to a gate-on voltage of a fifth gate signal and electrically connects the third node and the fourth node to each other.

5. The pixel circuit of claim 4, wherein a cathode voltage being applied from the cathode electrode is a voltage that is less than the initialization voltage, and the pixel driving voltage is a voltage that is greater than the initialization voltage.

6. The pixel circuit of claim 4, wherein in the initialization period, the first gate signal and the second gate signal are the gate-on voltages, and the third gate signal, the fourth gate signal, and the fifth gate signal are gate-off voltages;

wherein in the sampling period, the first gate signal and the third gate signal are the gate-on voltages, and the second gate signal, the fourth gate signal, and the fifth gate signal are the gate-off voltages;

wherein in the data writing period, the first gate signal, the third gate signal, and the fourth gate signal are the gate-on voltages, and the second gate signal and the fifth gate signal are the gate-off voltages; and wherein in the emission period, the second gate signal and the fifth gate signal are the gate-on voltages, and the first gate signal, the third gate signal, and the fourth gate signal are the gate-off voltages.

7. The pixel circuit of claim 6, wherein the first switch element and the second switch element are turned on in the initialization period, the sampling period, and the data writing period.

8. The pixel circuit of claim 6, wherein the third switch element is turned on in the initialization period and the emission period, and the fourth switch element is turned on in the sampling period and the data writing period.

9. The pixel circuit of claim 6, wherein the fifth switch element is turned on in the data writing period, and the sixth switch element is turned on in the emission period.

10. A display device comprising:

a display panel including a plurality of data lines, a plurality of gate lines, a plurality of pixel circuits, a cathode power line configured to supply a cathode voltage to a pixel circuit from the plurality of pixel circuits, a driving power line configured to supply a pixel driving voltage to the pixel circuit, and an initialization power line configured to supply an initialization voltage to the pixel circuit;

a data driving circuit configured to output a data voltage of pixel data to the plurality of data lines; and a gate driving circuit configured to sequentially output a gate signal to the plurality of gate lines, wherein the pixel circuit includes:

a driving element including a first electrode connected to a first node to which the pixel driving voltage is applied, a gate electrode connected to a second node to which the data voltage is applied, and a second electrode;

a light-emitting element including an anode electrode and a cathode electrode connected to the cathode power line, the light-emitting element configured to emit light by current from the driving element;

a first switch element connected to the anode electrode and the cathode electrode, the first switch element configured to electrically connect the anode electrode and the cathode electrode to each other in response to a first gate signal; and a second switch element connected to the first node and the second node, the second switch element configured to electrically connect the first node and the second node to each other in response to the first gate signal, wherein the pixel circuit is configured to be driven in an order of an initialization period, a sampling period, a data writing period, and an emission period, and wherein the first gate signal is a gate-on voltage during the initialization period, the sampling period, and the data writing period, and is a gate-off voltage during the emission period.

11. The display device of claim 10, wherein the first switch element is configured to be turned on in response to the gate-on voltage of the first gate signal and electrically connects the anode electrode and the cathode electrode to each other, and to be turned off in response to the gate-off voltage of the first gate signal; and wherein the second switch element is configured to be turned on in response to the gate-on voltage of the first gate signal and electrically connects the first node and the second node to each other, and to be turned off in response to the gate-off voltage of the first gate signal.

12. The display device of claim 10, further comprising:

a first capacitor connected to a fourth node that is connected to the anode electrode and the second node;

a third switch element configured to be turned on in response to a gate-on voltage of a second gate signal and electrically connects the driving power line and the first node to each other;

a fourth switch element configured to be turned on in response to a gate-on voltage of a third gate signal and electrically connects a third node connected to the second electrode of the driving element and the initialization power line to each other;

a second capacitor connected to a data line to which a data voltage is applied and the second node;

a fifth switch element configured to be turned on in response to a gate-on voltage of a fourth gate signal and electrically connects the data line and the second capacitor to each other; and a sixth switch element configured to be turned on in response to a gate-on voltage of a fifth gate signal and electrically connects the third node and the fourth node to each other.

13. The display device of claim 12, wherein in the initialization period, the first gate signal and the second gate signal are the gate-on voltages, and the third gate signal, the fourth gate signal, and the fifth gate signal are gate-off voltages;

wherein in the sampling period, the first gate signal and the third gate signal are the gate-on voltages, and the second gate signal, the fourth gate signal, and the fifth gate signal are the gate-off voltages;

wherein in the data writing period, the first gate signal, the third gate signal, and the fourth gate signal are the gate-on voltages, and the second gate signal and the fifth gate signal are the gate-off voltages; and wherein in the emission period, the second gate signal and the fifth gate signal are the gate-on voltages, and the first gate signal, the third gate signal, and the fourth gate signal are the gate-off voltages.

14. A display panel comprising:

a display area on which an input image is displayed;

a non-display area outside the display area;

a plurality of cathode power lines within the display area; and a plurality of pixel circuits in the display area, wherein each of the plurality of pixel circuits includes:

a driving element including a first electrode connected to a first node to which a pixel driving voltage is applied, a gate electrode connected to a second node to which a data voltage is applied, and a second electrode;

a light-emitting element including an anode electrode and a cathode electrode, the light-emitting element configured to emit light by current from the driving element;

a first switch element including a first electrode connected to the anode electrode, a second electrode connected to the cathode electrode, and a gate electrode to which a first gate signal is applied, the first switch element configured to electrically connect the anode electrode and the cathode electrode to each other in response to the first gate signal;

a second switch element connected to the first node and the second node, the second switch element configured to electrically connect the first node and the second node to each other in response to the first gate signal, an insulating layer covering the first electrode and the second electrode of the first switch element and a cathode power line from the plurality of cathode power lines;

a first planarization layer covering the insulating layer;

a first connection electrode in contact with the cathode power line in the non-display area through a first contact hole penetrating the first planarization layer;

a second connection electrode in contact with the first electrode of the first switch element in the display area through a second contact hole penetrating the first planarization layer;

a second planarization layer covering the first connection electrode and the second connection electrode; and a bank layer covering the second planarization layer, wherein the anode electrode is in contact with the second connection electrode in the display area through a third contact hole penetrating the second planarization layer, and the cathode electrode is in contact with the first connection electrode through a fourth contact hole penetrating the bank layer and the second planarization layer, and wherein the cathode electrode of the light-emitting element and the second electrode of the first switch element are connected to a corresponding cathode power line from the plurality of cathode power lines.

15. The display panel of claim 14, further comprising:

a first shorting bar on one side of the non-display area and connected to one end of each of the plurality of cathode power lines; and a second shorting bar on another side of the non-display area and connected to another end of each of the plurality of cathode power lines.

16. A pixel circuit comprising:

a driving element including a first electrode connected to a first node to which a pixel driving voltage is applied, a gate electrode connected to a second node to which a data voltage is applied, and a second electrode;

a light-emitting element including an anode electrode connected to a fourth node and a cathode electrode connected to a cathode power line;

a first switch element including a first electrode connected to the fourth node, a gate electrode connected to a first gate line, and a second electrode connected to the cathode electrode, the first switch element configured to electrically connect the anode electrode and the cathode electrode to each other in response to a first gate signal applied through the first gate line;

a first capacitor connected to the fourth node and the second node;

a second switch element including a first electrode connected to the first node, a gate electrode connected to the first gate line, and a second electrode connected to the second node, the second switch element configured to electrically connect the first node and the second node to each other in response to the first gate signal;

a third switch element including a first electrode connected to a driving power line that supplies the pixel driving voltage, a gate electrode connected to a second gate line, and a second electrode connected to the first node;

a fourth switch element including a first electrode connected to an initialization power line that supplies an initialization voltage, a gate electrode connected to a third gate line, and a second electrode connected to a third node;

a second capacitor connected to a data line to which a data voltage is applied and the second node;

a fifth switch element including a first electrode connected to the data line, a gate electrode connected to a fourth gate line, and a second electrode connected to the second capacitor; and a sixth switch element including a first electrode connected to the third node, a gate electrode connected to a fifth gate line, and a second electrode connected to the fourth node.

* * * * *